(12) United States Patent
Lee et al.

(10) Patent No.: US 8,306,940 B2
(45) Date of Patent: Nov. 6, 2012

(54) INTERACTIVE VISUALIZATION FOR GENERATING ENSEMBLE CLASSIFIERS

(75) Inventors: Bongshin Lee, Issaquah, WA (US); Ashish Kapoor, Kirkland, WA (US); Desney S. Tan, Kirkland, WA (US); Justin Talbot, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 12/408,663

(22) Filed: Mar. 20, 2009

(65) Prior Publication Data
US 2010/0241596 A1 Sep. 23, 2010

(51) Int. Cl.
*G06F 15/18* (2006.01)
*G06F 17/00* (2006.01)
*G06N 5/04* (2006.01)

(52) U.S. Cl. .................................... 706/61

(58) Field of Classification Search .................. None
See application file for complete search history.

(56) References Cited

U.S. PATENT DOCUMENTS

| | | | |
|---|---|---|---|
| 7,107,254 B1 | 9/2006 | Dumais | |
| 2002/0073195 A1 | 6/2002 | Hellerstein | |
| 2005/0249401 A1 | 11/2005 | Bahlmann | |
| 2005/0278322 A1 | 12/2005 | Fan | |
| 2006/0045337 A1* | 3/2006 | Shilman et al. | 382/181 |
| 2006/0204121 A1 | 9/2006 | Bryll | |
| 2006/0280341 A1 | 12/2006 | Koshizen | |
| 2008/0126273 A1 | 5/2008 | Carus | |
| 2008/0154807 A1* | 6/2008 | Chow et al. | 706/12 |
| 2008/0209320 A1* | 8/2008 | Mawhinney et al. | 715/700 |
| 2008/0249764 A1 | 10/2008 | Huang | |
| 2009/0006085 A1* | 1/2009 | Horvitz et al. | 704/223 |
| 2009/0137924 A1* | 5/2009 | Kapoor et al. | 600/545 |
| 2009/0154795 A1* | 6/2009 | Tan et al. | 382/155 |
| 2009/0316988 A1* | 12/2009 | Xu et al. | 382/173 |

OTHER PUBLICATIONS

Chodos et al. "ARC-UI: A Visualization for Associative Classifiers", 12th Intl. Conf. Information Visualization, 2008, pp. 296-301.*
Wang et al. "Classification Visualization with Shaded Similarity Matrix", technical report, 2002, pp. 9.*
Chan et al. "Ensemble Classifiers for Hyperspectral Classification", 5th EARSeL Workshop on Imaging Spectroscopy, 2007, pp. 11.*
Hill et al. Statistics: Methods & Applications, 2007.*

(Continued)

*Primary Examiner* — Jeffrey A Gaffin
*Assistant Examiner* — Li-Wu Chang
(74) *Attorney, Agent, or Firm* — Lyon & Harr, L.L.P.; Craig S. Fischer

(57) ABSTRACT

A real-time visual feedback ensemble classifier generator and method for interactively generating an optimal ensemble classifier using a user interface. Embodiments of the real-time visual feedback ensemble classifier generator and method use a weight adjustment operation and a partitioning operation in the interactive generation process. In addition, the generator and method include a user interface that provides real-time visual feedback to a user so that the user can see how the weight adjustment and partitioning operation affect the overall accuracy of the ensemble classifier. Using the user interface and the interactive controls available on the user interface, a user can iteratively use one or both of the weigh adjustment operation and partitioning operation to generate an optimized ensemble classifier.

20 Claims, 15 Drawing Sheets

OTHER PUBLICATIONS

Ankerst, M., C. Elsen, M. Ester, H.-P. Kriegel, Visual classification: An interactive approach to decision tree construction, Proc. of the Fifth ACM SIGKDD Int'l Conf. on Knowledge Discovery and Data Mining, Aug. 15-18, 1999, pp. 392-396, San Diego, CA, USA.

Banfield, R. E., L. O. Hall, K. W. Bowyer, W. P. Kegelmeyer, Ensembles of classifiers from spatially disjoint data, Proceedings of the 6th Int'l Workshop on Multiple Classifier Systems, Jun. 13-15, 2005, pp. 196-205, Seaside, CA, USA.

Bauckhage, C., T. Käster, J. K. Tsotsos, Applying ensembles of multilinear classifiers in the frequency domain, 2006 IEEE Comp. Soc. Conf. on Comp. Vision and Pattern Recognition, Jun. 17-22, 2006, pp. 95-102, New York, NY, USA.

Bosch, A., A. Zisserman, X. Muñoz, Representing shape with a spatial pyramid kernel, Proc. of the 6th ACM Int'l Conf. on Image and Video Retrieval, CIVR 2007, Jul. 9-11, 2007, pp. 401-408, Amsterdam, The Netherlands.

Breiman, L., Bagging predictors, Technical Report No. 421, Sep. 1994, Department of Statistics, University of Berkeley, Berkeley CA.

Caragea, D., D. Cook, V. Honavar, Gaining insights into support vector machine pattern classifiers using projection-based tour methods, Proc. of the Seventh ACM SIGKDD Int'l Conf. on Knowledge Discovery and Data Mining, Aug. 26-29, 2001, pp. 251-256, San Francisco, CA, USA.

Drummond, C., R. C. Holte, Cost curves: An improved method for visualizing classifier performance, Machine Learning, May 8, 2006, pp. 95-130, vol. 65, No. 1, published Online.

Evgeniou, T., M. Pontil, A. Elisseeff, Leave one out error, stability, and generalization of voting combinations of classifiers, Machine Learning, Apr. 2004, pp. 71-97, vol. 55, No. 1, The Netherlands.

Fails, J. A., D. R. Olsen, Jr., Interactive machine learning, Proc. of the 8th Int'l Conf. on Intelligent User Interfaces, Jan. 12-15, 2003, pp. 39-45, ACM New York, NY, USA.

Fei-Fei, L., R. Fergus, P. Perona, Learning generative visual models from few training examples: An incremental Bayesian approach tested on 101 object categories, Computer Vision and Image Understanding, Apr. 2007, pp. 59-70, vol. 106, No. 1.

Fogarty, J., A. J. Ko, H. H. Aung, E. Golden, K. P. Tang, S. E. Hudson, Examining task engagement in sensor-based statistical models of human interruptibility, Proc. of the 2005 Conf. on Human Factors in Computing Sys's, CHI 2005, Apr. 2-7, 2005, pp. 331-340, Portland, Oregon, USA.

Frank, E., M. Hall, Visualizing class probability estimators, Working Paper Series, ISSN 1170-487X, Feb. 19, 2003, pp. 1-13, Department of Computer Science, The University of Waikato, Hamilton, New Zealand.

Garner, S, R., WEKA: The Waikato environment for knowledge analysis, Proc. of the New Zealand Comp. Science Research Students Conf., Apr. 18-21, 1995, pp. 57-64, Hamilton, New Zealand.

Grauman, K., T. Darrell, The Pyramid Match Kernel: Discriminative classification with sets of image features, 10th IEEE Int'l Conf. on Comp. Vision, ICCV 2005, Oct. 17-20, 2005, pp. 1458-1465, Beijing, China.

Grimes, D. B., D. S. Tan, S. E. Hudson, P. Shenoy, R. P. N. Rao, Feasibility and pragmatics of classifying working memory load with an electroencephalograph, Proc. of the 2008 Conf. on Human Factors in Computing Sys's, CHI 2008, Apr. 5-10, 2008, pp. 835-844, Florence, Italy.

Henry, N., J.-D. Fekete, MatrixExplorer: A dual-representation system to explore social networks, IEEE Trans. Vis. Comput. Graph., Sep.-Oct. 2006, pp. 677-684, vol. 12, No. 5.

Kapoor, A., K. Grauman, R. Urtasun, T. Darrell, Active learning with Gaussian processes for object categorization, IEEE 11th Int'l Conf. on Comp. Vision, ICCV 2007, Oct. 14-20, 2007, pp. 1-8, Rio de Janeiro, Brazil.

Kapoor, A., E. Horvitz, Experience sampling for building predictive user models: A comparative study, Proc of the 2008 Conf. on Human Factors in Computing Sys's, CHI 2008, Apr. 5-10, 2008, pp. 657-666, Florence, Italy.

Kim, B. H., B. Lee, J. Seo, Visualizing set concordance with permutation matrices and fan diagrams, Interacting with Computers, Dec. 2007, pp. 630-643, vol. 19, No. 5-6.

Kittler, J., M. Hatef, R. P. W. Duin, J. Matas, On combining classifiers, IEEE Trans. Pattern Anal. Mach. Intell., Mar. 1998, pp. 226-239, vol. 20, No. 3.

Lazebnik, S., C. Schmid, J. Ponce, Beyond bags of features: Spatial pyramid matching for recognizing natural scene categories, 2006 IEEE Computer Society Conf. on Comp. Vision and Pattern Recognition, CVPR 2006, Jun. 17-22, 2006, pp. 2169-2178, New York, NY, USA.

Liu, D., A. P. Sprague, J. G. Gray, PolyCluster: An interactive visualization approach to construct classification rules, Proc. of the 2004 Int'l Conf. on Machine Learning and Applications, ICMLA 2004, Dec. 16-18, 2004, pp. 280-287, Louisville, KY, USA.

Mäkinen, E., H. Siirtola, The Barycenter heuristic and the reorderable matrix, Informatica (Slovenia), Oct. 2005, pp. 357-363, vol. 29, No. 3.

Meyer, M., H. Lee, A. Barr, M. Desbrun, Generalized Barycentric coordinates on irregular polygons, J. of Graphics Tools, Nov. 2002, pp. 13-22, vol. 7.

Oliver, N., A. Garg, E. Horvitz, Layered representations for learning and inferring office activity from multiple sensory channels, Comp. Vision and Image Understanding, Nov. 2004, pp. 163-180, vol. 96, No. 2.

Rheingans, P., M. desJardins, Visualizing high-dimensional predictive model quality, Proc. of IEEE Visualization, Oct. 2000, pp. 493-496.

Saponas, T. S., D. S. Tan, D. Morris, R. Balakrishnan, Demonstrating the feasibility of using forearm electromyography for muscle-computer interfaces, Proc. of the 2008 Conf. on Human Factors in Computing Sys's, CHI 2008, Apr. 5-10, 2008, pp. 515-524, Florence, Italy.

Schapire, R. E., The boosting approach to machine learning: An overview, MSRI Workshop on Nonlinear Estimation and Classification, Dec. 19, 2001.

Stiglic, G., M. Mertik, V. Podgorelec, P. Kokol, Using visual interpretation of small ensembles in microarray analysis, 19th IEEE Int'l Symposium on Computer-Based Medical Sys's, CBMS 2006, Jun. 22-23, 2006, pp. 691-695, Salt Lake City, Utah, USA.

Urbanek, S., Exploring statistical forests, Proc. of the 2002 Joint Statistical Meeting, Aug. 2002, Springer.

Varma, M., D. Ray, Learning the discriminative power-invariance trade-off, IEEE 11th Int'l Conf. on Computer Vision, ICCV 2007, Oct. 14-20, 2007, pp. 1-8, Rio de Janeiro, Brazil.

Zhang, H., A. C. Berg, M. Maire, J. Malik, SVM-KNN: Discriminative nearest neighbor classification for visual category recognition, 2006 IEEE Computer Society Conf. on Comp. Vision and Pattern Recognition, CVPR 2006, Jun. 2006, pp. 2126-2136, New York, NY, USA.

* cited by examiner

|   | PREDICTED | | | |
|---|---|---|---|---|
| | APPLES | BALLS | CATS | DOGS |
| APPLES | 41 | 10 | 4 | 5 |
| BALLS | 21 | 38 | 1 | 0 |
| CATS | 22 | 0 | 36 | 2 |
| DOGS | 20 | 0 | 1 | 39 |

TRUE (row labels)

|   | 1 | 2 | 3 | 4 | 5 | 6 | 7 | 8 | 9 | 0 |
|---|---|---|---|---|---|---|---|---|---|---|
| 1 | 91 | 1 | 1 | 2 | 10 | 0 | 2 | 1 | 4 | 2 |
| 2 | 0 | 89 | 2 | 0 | 7 | 1 | 0 | 2 | 0 | 1 |
| 3 | 1 | 1 | 48 | 0 | 12 | 1 | 1 | 47 | 0 | 1 |
| 4 | 2 | 1 | 1 | 83 | 10 | 1 | 0 | 1 | 0 | 1 |
| 5 | 0 | 1 | 2 | 0 | 30 | 1 | 1 | 1 | 1 | 2 |
| 6 | 1 | 1 | 0 | 3 | 4 | 95 | 1 | 1 | 0 | 1 |
| 7 | 3 | 2 | 3 | 7 | 5 | 0 | 94 | 2 | 0 | 2 |
| 8 | 1 | 1 | 40 | 2 | 11 | 0 | 0 | 43 | 3 | 1 |
| 9 | 0 | 2 | 1 | 3 | 5 | 1 | 1 | 0 | 92 | 2 |
| 0 | 1 | 1 | 2 | 0 | 6 | 0 | 0 | 2 | 0 | 87 |

INTERACTIVE VISUALIZATION FOR GENERATING ENSEMBLE CLASSIFIERS

BACKGROUND

Machine learning (ML) techniques utilize computational and statistical methods to automatically extract information from data. These techniques allow computers to "learn." Recently, human-computer interaction (HCI) researchers have taken increasing interest in building classifiers using machine learning for their applied value. For example, using applied machine learning techniques, HCI researchers can disambiguate and interpret noisy streams of data and develop novel input modalities. In addition, these researchers can analyze complex patterns in data to perform predictions or diagnoses, or infer user intent to optimally adapt interfaces to assist users.

As machine learning becomes more widely used for its applied value, both within the HCI community and beyond, a critical challenge is to provide adequate tools to allow non-experts to effectively utilize ML techniques. Researchers who are non-experts in machine learning techniques frequently use these in multiple-class (or multi-class) classification problems. For such problems, the goal is to develop an algorithm (such as a "classifier" or a "model") that will assign input data to one of a discrete number of classes. While standard classification considers problems where there are two possible classes, multi-class classification permits any number of classes. One example of a multi-class classification problem is classifying handwritten characters as one of the 26 letters of the alphabet. In general, the multi-class classification problem is considered a much more challenging problem in machine learning than the binary classification problem.

At present, a common applied machine learning workflow is to iteratively develop classifiers by refining low-level choices such as feature selection, algorithm selection, and parameter tuning. This is usually performed using manual trial and error in an approach that represents hill-climbing through the model space. Models are compared using accuracy or other coarse summaries. However, these simple summaries provide little direction on how to improve the classifier. This problem is exacerbated in multi-class classification problems where single value summaries, such as accuracy, can be quite misleading.

To address this issue, previous research has focused on developing tools for better explaining a single classifier's behavior (or misbehavior). However, this workflow is often sub-optimal. In particular, this workflow obscures the beneficial dependencies and complementarities that exist between classifiers and discards the context of the space of possible models. Moreover, it often leads to poor local maxima, and the large work in generating the series of models is often wasted as there are no means to compare and evaluate the trajectory of models being learned.

Previous work has noted the importance of human involvement to provide training data and has proposed an interactive machine learning model that allows users to train, classify, and correct classifications in a continuously iterative loop. In a recent study, the current use of machine learning by non-expert researchers was evaluated and three difficulties were identified: (1) applying an iterative exploration process; (2) understanding the machine learning models; and (3) evaluating performance. The conclusion of the study was to create a library of models known to work well for a variety of common problems. Such a library could be the source of an initial set of models.

Researchers also have looked into the general problem of combining decisions from multiple classifiers. Simple rules such as majority vote, sum, product, maximum and minimum of the classifier outputs are popular and often produce results better than individual classification system. One problem, however, with these fixed rules is that it is difficult to predict which rule will perform best. At the other end of the spectrum are critic-driven approaches, such as layered hidden Markov models (HMMs), where the goal is to "learn" a good combination scheme using a hierarchy of classifiers. One disadvantage with these critic-driven approaches is that they require a large amount of labeled training data, which often is prohibitive for HCI work.

In order to aid machine learning development, researchers have explored various ways to visualize specific machine learning algorithms, including naïve-Bayes, decision trees, support vector machines (SVMs), and HMMs. One study has shown that such tools can produce better classifiers than automatic techniques. However, since these visualizations and interaction techniques are tied to specific algorithms, they do not support comparisons across algorithm types.

More general visualization techniques that apply across algorithm types include receiver operating characteristic (ROC) and Cost curves, which support evaluation of model performance as a function of misclassification costs. These visualization techniques are commonly used in the machine learning community. For practical purposes, however, they are restricted to binary classification tasks and they do not directly support iterative improvement of a classifier.

One popular visualization technique in machine learning is to plot the data instances in some projection of feature space and visualize model prediction boundaries. This approach generalizes across algorithms at the expense of not showing the internal operation of the particular algorithm. One approach uses visualizations of summary statistics derived from a large set of decision trees generated by boosting. Another approach visually compares a small set of decision trees produced by boosting.

It has been shown that matrix visualization can be used to exhibit high-level structures by reordering the rows and columns of the matrix. Many researchers have attempted to exploit the benefits of matrix reordering. For example, one approach provides an overview using a permutation matrix to enable users to easily identify relationships among sets with a large number of elements. Another approach uses reordered matrix-based representation in addition to node-link diagrams to support social network analysis. Yet another approach uses a shaded similarity matrix with reordering to visualize clusters in classification. However, these approaches are designed for visualizing only the similarity of data instances.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the real-time visual feedback ensemble classifier generator and method include interactively generating an optimal ensemble classifier using a user interface. A weight adjustment operation and a partitioning operation are used in the interactive generation process. The user interface provides visual feedback to a user so that the user can see in real time how the weight adjustment and partitioning operation affect the overall accuracy of the ensemble classifier.

The ensemble classifier is a weighted combination of a plurality of previously-trained component classifiers. A training data set that includes multiple classes is used to train the ensemble classifier. Embodiments of the real-time visual feedback ensemble classifier generator and method make use of graphical view of confusion matrices for each component classifier and a confusion matrix for the ensemble classifier. The general idea is for the user to use the weight adjustment operation and the partitioning operation to place data instances on a diagonal of the ensemble classifier confusion matrix. This type of visualization helps a user understand the relative merits of various component classifiers. In other words, the user is able to directly interact with the visualizations in order to explore and build combination models with the purpose of generating an optimal ensemble classifier.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 1 illustrates an example of a confusion matrix.

FIG. 2 illustrates a standard confusion matrix for an example handwritten ten-digit classification task.

DETAILED DESCRIPTION

Figure 3:
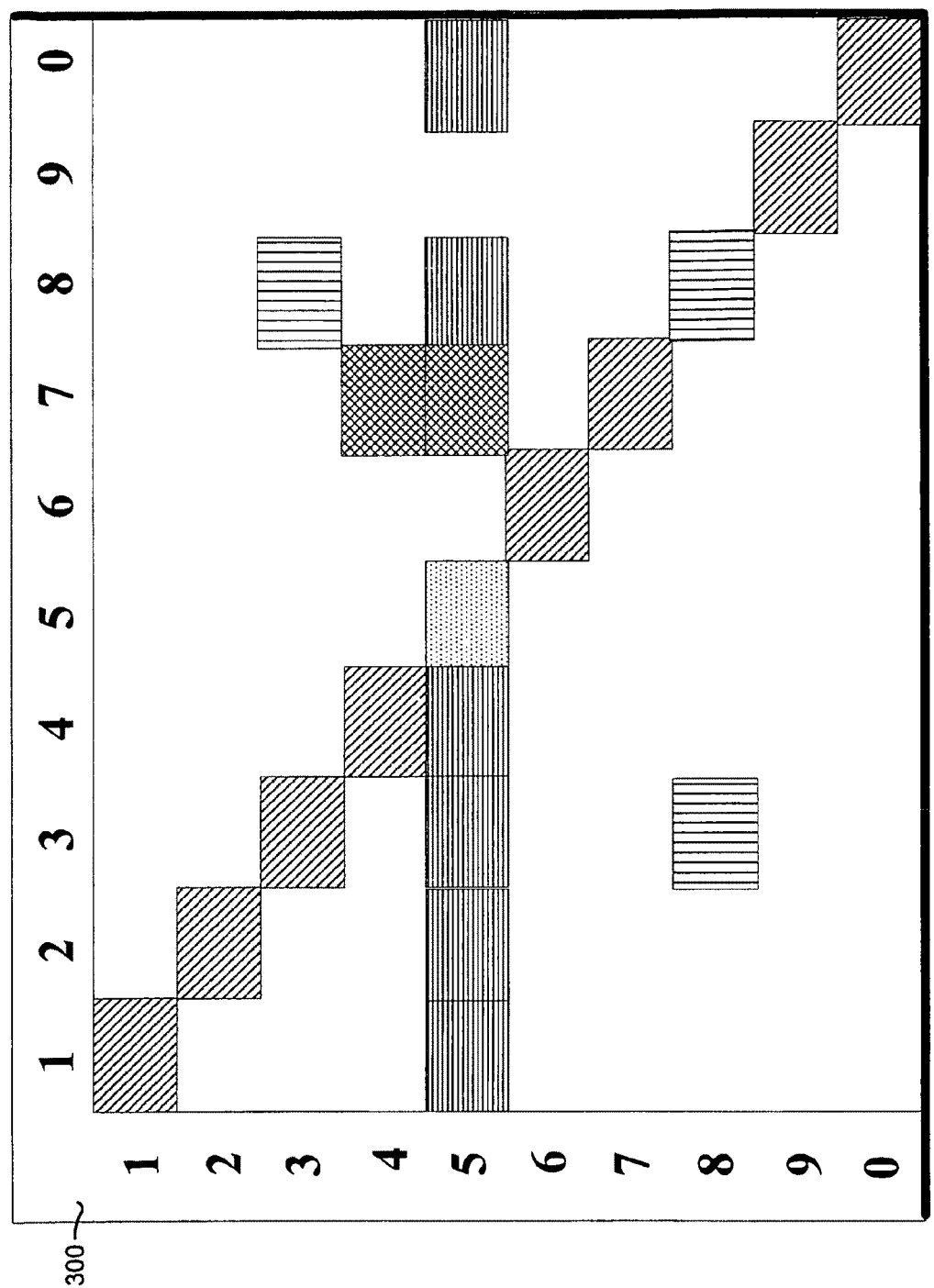
FIG. 3 illustrates a heat map confusion matrix for the example handwritten ten-digit classification task shown in FIG. 2.

In the following description of embodiments of the real-time visual feedback ensemble classifier generator and method reference is made to the accompanying drawings, which form a part thereof, and in which is shown by way of illustration a specific example whereby embodiments of the real-time visual feedback ensemble classifier generator and method may be practiced. It is to be understood that other embodiments may be utilized and structural changes may be made without departing from the scope of the claimed subject matter.

I. Confusion Matrix

Preparatory to discussing embodiments of the real-time visual feedback ensemble classifier generator and method, it is instructive to make clear the concept of a confusion matrix. A confusion matrix is a visualization tool that often is used in the machine learning community. The confusion matrix shows the level of agreement (or disagreement) between two classifications. Each column of the matrix represents data instances in a predicted class, while each row represents the data instances in an actual class (or a correct classification of a particular class). One benefit of a confusion matrix is that it is easy to see if the learning system is confusing two classes by mislabeling one class as another class.

FIG. 1 illustrates an example of a confusion matrix 100. The rows of the confusion matrix 100 are labeled "True," and contain the classes "Apple," "Balls," "Cats," and "Dogs." The columns of the confusion matrix 100 are labeled "Predicted," and contain the same classes as the rows of the confusion matrix 100. Suppose that an image of an apple is processed by a classifier such that the classifier classifies the apple as a ball. In this case, the particular cell Apples-Balls is incremented. This indicates that the classifier has confused the class Apple object with a class Ball object. For each data instance the appropriate cell is incremented.

Ideally, the classifier will always classify correctly. In this ideal situation when the classifier has classified correctly, the confusion matrix will have large numbers on the diagonal and numbers off the diagonal will be zero. This is a measure of the performance of the classifier. If there are mostly large numbers on the diagonal, then the classifier is doing a good job of classification. On the other hand, if the diagonal looks like most of the other numbers in the confusion matrix then the classifier is doing a poor job of classification.

In addition, it can be determined from the confusion matrix whether the classifier is having a problem with a particular class. For example, in FIG. 1 it can be seen by looking at the Balls-Apples cell that this particular classifier frequently confuses a ball with an apple. The objective is to adjust the classifier so that all non-zero numbers are contained in the columns and rows that lay on the diagonal and that only zeros are in the rows and columns off the diagonal.

FIG. 2 illustrates a standard confusion matrix 200 for an example handwritten ten-digit classification task. Similar to FIG. 1, it can be seen that FIG. 2 merely contains numbers in the confusion matrix 100, 200. Referring to both FIGS. 1 and 2, note that it can be difficult to quickly determine which numbers are being misclassified based on just the numbers in the confusion matrices 100, 200.

One way of making the misclassifications easy to identify is to use a heat-map confusion matrix. FIG. 3 illustrates a heat map confusion matrix 300 for the example handwritten ten-digit classification task shown in FIG. 2. Note that it is much easier to identify patterns in FIG. 3 as compared to FIG. 2. For example, from FIG. 3 it can easily be seen that the number "3" and the number "8" often are misclassified as each other. Moreover, it can be seen from FIG. 3 that the number "5" is often misclassified as several different numbers.

II. System Overview

Figure 4:
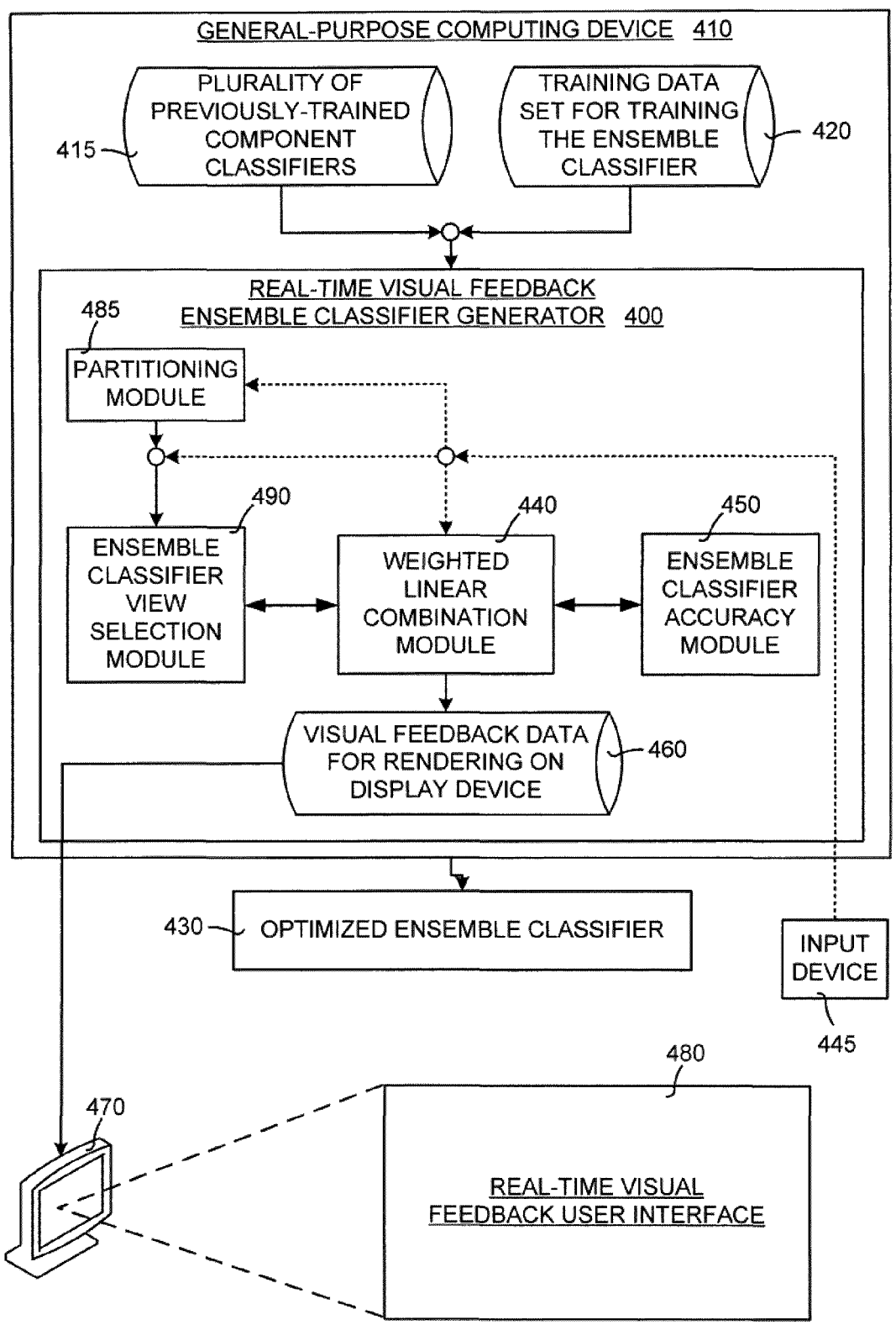
FIG. 4 is a block diagram illustrating a general overview of embodiments of the real-time visual feedback ensemble classifier generator and method disclosed herein.

FIG. 4 is a block diagram illustrating a general overview of embodiments of the real-time visual feedback ensemble classifier generator and method disclosed herein. It should be noted that the implementation shown in FIG. 4 is only one of many implementations that are possible. Referring to FIG. 4, a real-time visual feedback ensemble classifier generator 400 is shown implemented on a computing device 410. It should be noted that the computing device 410 may include a single processor (such as a desktop or laptop computer) or several processors and computers connected (either physically or wirelessly) to each other.

In general, embodiments of the real-time visual feedback ensemble classifier generator 400 provide a user with visual feedback in real time to allow the user to generate a trained ensemble classifier. This ensemble classifier is made up of a plurality of previously-trained component (or individual) classifiers 415, which are also input to the real-time visual feedback ensemble classifier generator 400. Additional input to the real-time visual feedback ensemble classifier generator 400 is a training data set for training the ensemble classifier 420. It should be noted that the component classifiers 415 are already trained; the training data set 420 is used to train the ensemble classifier, which is an aggregate of the plurality of previously-trained component classifiers 415. The output of the real-time visual feedback ensemble classifier generator 400 is an optimized ensemble classifier 430.

The real-time visual feedback ensemble classifier generator 400 includes a weighted linear combination module 440. This module 440 combines the plurality of previously-trained component classifiers 415 in a linear manner to generate the ensemble classifier. In addition, each of the component classifiers 415 has a weight. The amount of this weight dictates how much influence a particular component classifier has on the resultant ensemble classifier when the weighted component classifiers are linearly combined by the module 440.

A user can interact with the weighted linear combination module 440 through an input device 445. As shown in FIG. 4, input from user is shown as dotted lines. The input device 445 allows the user to change weights of the component classifiers using a variety of interactive tools, as explained in detail below. Based on adjustments to the weights by the user, an ensemble classifier accuracy module 450 provides real-time accuracy feedback of the ensemble classifier generation process. In addition, the real-time visual feedback ensemble classifier generator 400 generates visual feedback data 460 for rendering on a display device 470. This visual feedback data is updated in real time as the user makes adjustments to the weights of the component classifiers 415.

The real-time visual feedback ensemble classifier generator 400 also includes a real-time visual feedback user interface 480. This user interface 480 displays to the user in real time the visual feedback data 460 generated whenever the user makes adjustments. Moreover, as explained in detail below, the real-time visual feedback user interface 480 includes a variety of confusion matrices for component classifiers that keep the user apprised of how the adjustments the user is making to the component classifiers 415 impacts the ensemble classifier being generated.

The real-time visual feedback ensemble classifier generator 400 also includes a partitioning module 485. This module allows the user to interactively partition an ensemble classifier confusion matrix shown on the real-time visual feedback user interface 480 to divide the confusion matrix into two sections. As explained in detail below, this partitioning allows the user to isolate portions of the confusion matrix that are relatively accurate (where data instances lay on the diagonal) and portions of the matrix that are inaccurate. The user then can work on improving the overall accuracy of the ensemble classifier by adjusting weights of classifiers using a portion of the training data set within the partition.

The real-time visual feedback ensemble classifier generator 400 also includes an ensemble classifier view selection module 490. This module 490 allows a user to select a desired partition on the ensemble classifier confusion matrix. Once the partition is selected, the user can adjust the weights of the component classifiers based on the portion of the training data set in that selected partition. Visual feedback data 460 is provided constantly in real time to the user through the real-time visual feedback user interface 480 during the partitioning and weight adjustment operations.

III. Operational Overview

Figure 5:
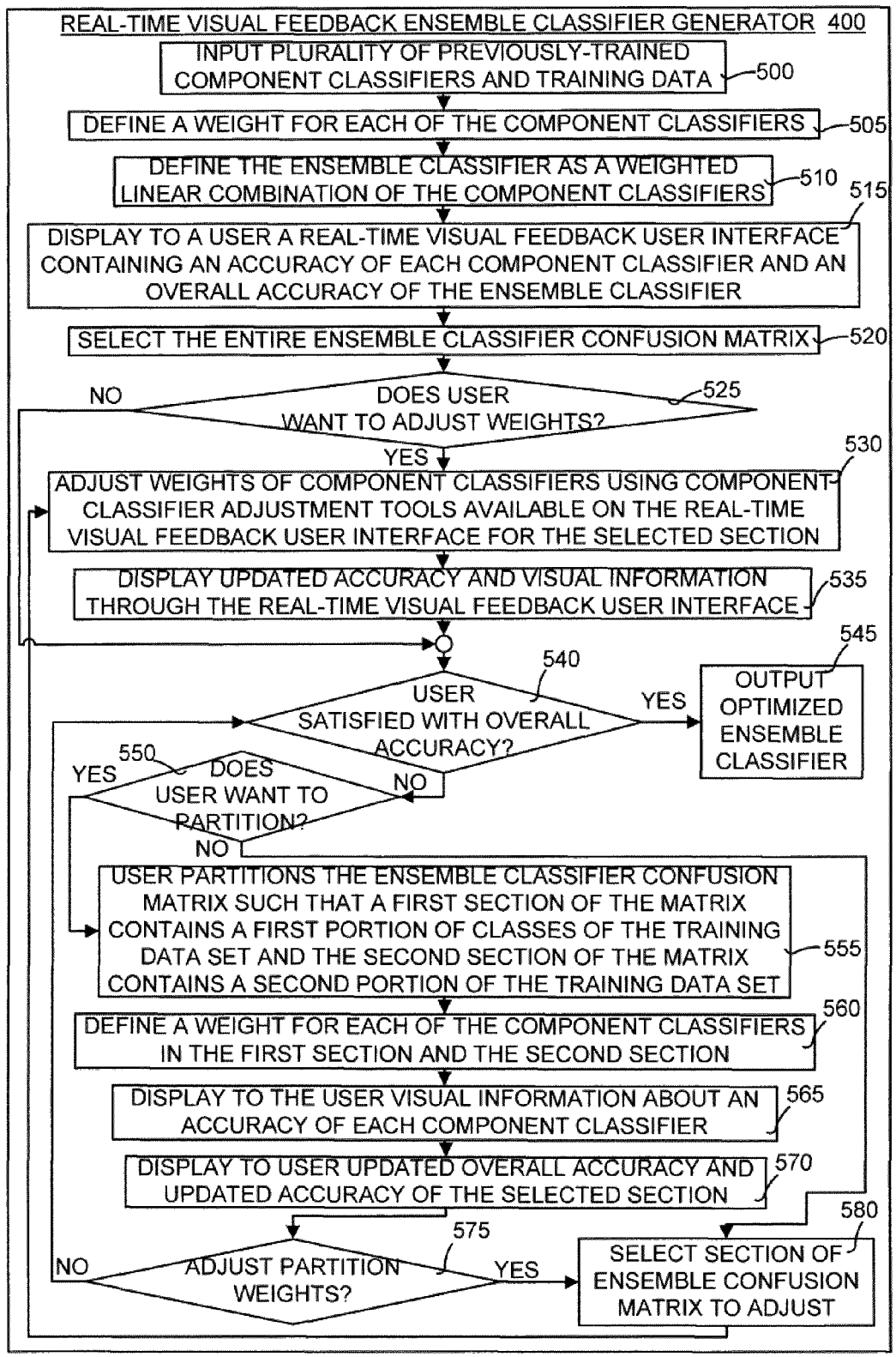
FIG. 5 is a flow diagram illustrating the operation of embodiments of the real-time visual feedback ensemble classifier generator and method shown in FIG. 4.

FIG. 5 is a flow diagram illustrating the operation of embodiments of the real-time visual feedback ensemble classifier generator 400 and method shown in FIG. 4. In general, the method uses weighted linear combination and partitioning through interactive user actions to generate an optimized ensemble classifier. Referring to FIG. 5, the method begins by inputting a plurality of previously-trained component classifiers and training data set containing a plurality of classes for training the ensemble classifier (box 500). The generator 400 then defines a weight for each of the component classifiers in a weighted linear combination of the component classifiers (box 505). Moreover, this weighted linear combination of the component classifiers is defined as an ensemble classifier (box 510).

The generator 400 displays to a user a real-time visual feedback user interface (box 515). This user interface contains visual information about an accuracy of each component classifier and an overall accuracy of the ensemble classifier based on the weighted linear combination. The entire ensemble classifier confusion matrix then is selected as the default selection (box 520). When the user begins this method (such as by opening a data set and a set of component classifiers), the entire ensemble classifier confusion matrix is the section by default.

The user then decides whether to adjust the weights of the each of the component classifiers in a weighted linear combination (box 525). If the user does want to adjust the weights, then the user adjusts the weights of one or more component classifiers using one or more component classifier adjustment tools that are available through the real-time visual feedback user interface (box 530). These component classifier adjustment tools are discussed in detail below. Each time the user adjust a weight, the real-time visual feedback user interface displays updated accuracy and visual information for the change (box 535). This allows the user to see in real time the effect that changing the weights has on the overall accuracy of the ensemble classifier.

If the user does not want to adjust the weights, a determination then is made as to whether the user is satisfied with the overall accuracy of the ensemble classifier (box 540). At this point, the user can choose to partition the ensemble classifier confusion matrix if the user identifies good partition points in the confusion matrix, or choose to do nothing if the user is satisfied with the overall accuracy or feels that no further improvement can be made. If the user chooses to no longer attempt to improve the overall accuracy, or if the user feels that the current overall accuracy of the ensemble classifier is near or at the maximum overall accuracy, then the ensemble classifier at the current overall accuracy and with its current weighted linear combination of component classifiers is considered the optimized ensemble classifier. This optimized ensemble classifier then is output (box 545).

If the user is not satisfied with the current overall accuracy, then a determination is made as to whether the user wants to partition the ensemble classifier confusion matrix (box 550). This user may want to partition the ensemble classifier confusion matrix when, after adjusting the weights, the user identifies a good partition point in the ensemble classifier confusion matrix. If the user does want to partition the ensemble classifier confusion matrix, then the user partitions that a first section of the ensemble classifier confusion matrix contains a first portion of classes of the training data set and a second section of the ensemble classifier confusion matrix contains a second portion of classes of the training data set (box 555). In other words, the component classifiers in the first section are based on the first portion of the training data set and the component classifiers in the second section are based on the second portion of the training data set.

The generator then defines weights for each of the component classifiers in the first section and the second section (box 560). The real-time visual feedback user interface then displays to the user visual information about an accuracy of each component classifier in the selected section (box 565). In addition, the user interface displays updated overall accuracy and an updated accuracy of the component classifiers contained in the selected section (box 570). As described below, the real-time visual feedback user interface also provides a mechanism so that if the user is dissatisfied with the current weights of the weighted linear combination the user can click on an "Equalize Weights" button to return the weighted linear combination to the state where all of the weights of the component classifiers are equal.

A determination then is made as to whether the user wants to adjust the weights of component classifiers in any of the partitions or sections (box 575). If not, then the method returns to a determination as to whether the user is satisfied with the overall accuracy of the ensemble classifier (box 540), as described above. If the user does want to adjust the weights of the component classifiers in any of the partitions and if the user does not want to partition (such as if no good partition points can be found) as described in box 550, then the user selects which section of the ensemble classifier confusion matrix to adjust (box 580). Once a section or partition is selected, then the user can adjust the weights of the component classifiers in the selected matrix section independent of the other matrix sections. Using this process, the user can adjust the weights of the component classifiers in the sections and perform additional partitioning until the user is satisfied with the overall accuracy of the ensemble classifier. As the user is adjusting the weights of the component classifiers in the ensemble classifier confusion matrix (or a partitioned section thereof), the generator 400 displays in real time updated accuracy and visual information through the real-time visual feedback user interface. This is an iterative process, with the output of the generator 400 being the optimized ensemble classifier (box 545).

Embodiments of the real-time visual feedback ensemble classifier method also include a mechanism for the user to unpartition at any time. In particular, the user may realize after creating a partition that the specific partition does not work as well as desired. The method provides a way for the user to unpartition a previously-created partition. This unpartitioning process can be performed at any time to any section that has sub-partitions. In addition, the unpartition feature is recursively applied to sub-partitions if they have further sub-partitions, such that unpartitioning a selected parent partition will also eliminate child partitions of the parent partition.

IV. Operational Details

The operational details of embodiments of the real-time visual feedback ensemble classifier generator 400 and method now will be discussed. These embodiments include embodiments of the real-time visual feedback user interface 480, the weighted linear combination module 440, the partitioning module 485, and the ensemble classifier accuracy module 450, shown in FIG. 4. The operational details of each of these programs modules now will be discussed in detail.

IV.A. Real-Time Visual Feedback User Interface

Figure 6:
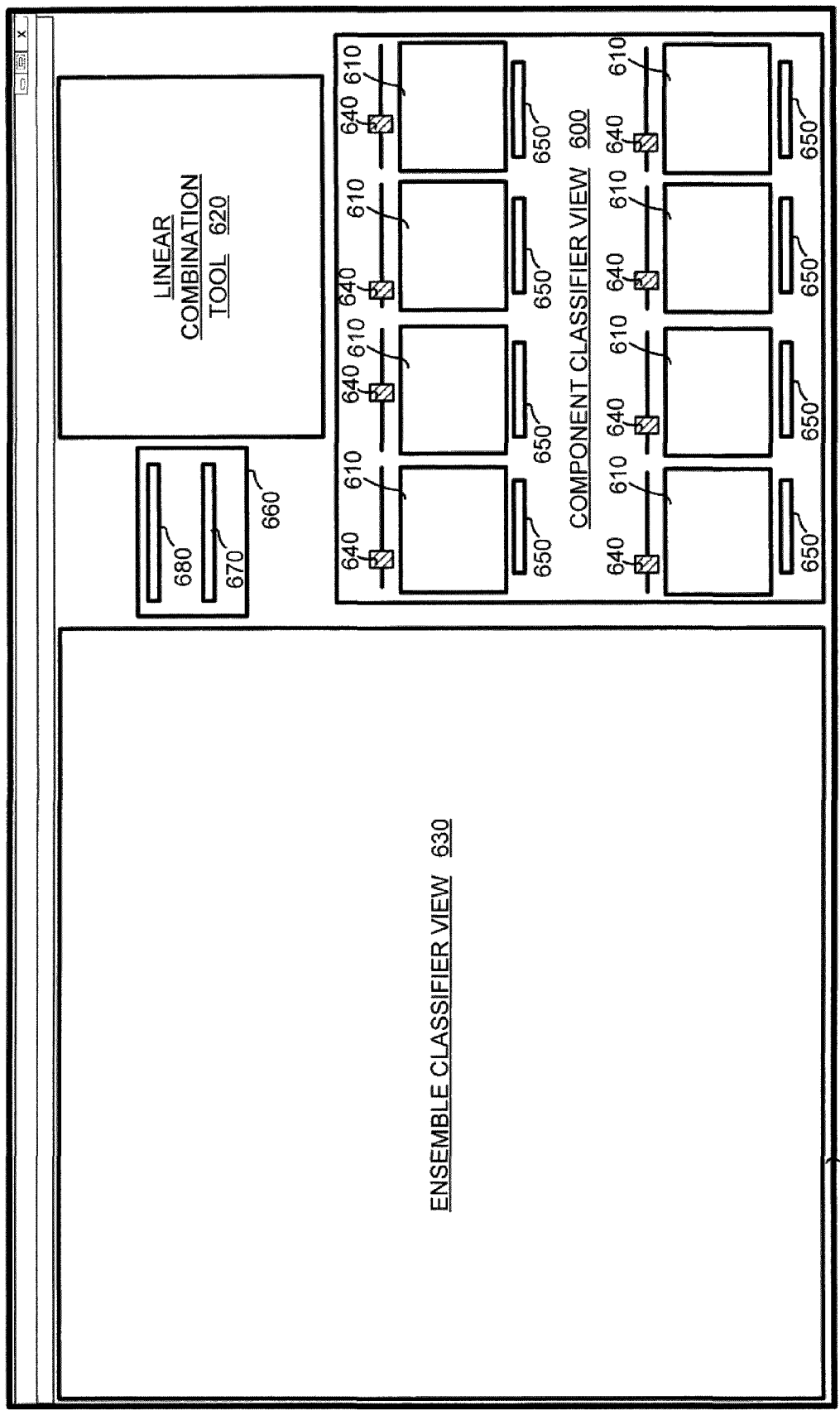
FIG. 6 is a block diagram illustrating an exemplary overview of embodiments of the real-time visual feedback user interface shown in FIG. 4.

FIG. 6 is a block diagram illustrating an exemplary overview of embodiments of the real-time visual feedback user interface 480 shown in FIG. 4. It should be noted that the implementation shown in FIG. 6 is only one of many implementations that are possible. The real-time visual feedback user interface 480 includes three basic sections. One section is a component classifier view 600. In the exemplary embodiment shown in FIG. 6, the component classifier view 600 is on the lower right quarter of the user interface 480. The component classifier view 600 contains an entry for each component classifier that the user (not shown) has imported to explore. In the exemplary embodiment shown in FIG. 6, the component classifier view 600 includes eight separate confusion matrices 610 for the eight classifiers being used by the generator 400.

Another section of the ensemble classifier user interface 480 is a first linear combination tool 620. In the exemplary embodiment shown in FIG. 6, the first linear combination tool 620 is located in the upper right quarter of the user interface 480. A third section of the user interface is a main ensemble classifier view 630. In the exemplary embodiment shown in FIG. 6, the ensemble classifier view 630 is located on the left half of the user interface 480.

The first linear combination tool can only represent two dimensions and hence much of the weight space may not be covered by the first linear combination tool 620. Therefore, the component classifier view 600 also includes a second linear combination tool 640 consisting of a slider control over each component classifier confusion matrix 610. The second linear combination tool 640 allows a user to manipulate an associated weight of each component classifier. The second linear combination tool 640 allows the user to specify an arbitrary normalized combination of weights if the first linear combination tool 620 is not sufficient.

Both the component classifier view 600 and the ensemble classifier view 630 visually represent a component classifier as a graphical heat map of its corresponding confusion matrix. As noted above, a confusion matrix represents classification results by plotting data instances in a grid where the column is an instance's predicted class and the row an instance's true class. Confusion matrices can reveal trends and patterns in the classification results and by extension reveal behavior of the classifier itself. The confusion matrix is used as the core visual element of the generator 400 because it can represent results from all classification algorithms. Moreover, interpretation of a confusion matrix is relatively algorithm agnostic.

The ordering of the matrix can greatly influence the patterns visible. The real-time visual feedback ensemble classifier generator 400 orders each matrix in the component classifier view 600 independently to highlight sets of classes which are frequently confused by a particular classifier. This corresponds to grouping clusters in an adjacency matrix. Additionally, as a user updates the ensemble classifier view 630, the ensemble classifier confusion matrix in the ensemble classifier view 630 is reordered in real time. As this necessitates a fast reordering technique, in some embodiments the reordering technique is a barycenter heuristic, which is a technique borrowed from the layout of bipartite graphs and is known to those having ordinary skill in the art.

In some embodiments, and the exemplary embodiment shown in FIG. 6, small bars 650 are located below each matrix 610 in the component classifier view 600. These small bars 650 depict accuracies for each corresponding classifier. In addition, the user interface 480 contains a main accuracy area 660. In some embodiments, and as shown in FIG. 6, this main accuracy area 660 contains a similar set of bars adjacent the linear combination tool 620. In some embodiments, an overall accuracy bar 670 depicts an overall accuracy of the current ensemble classifier and a selected node accuracy bar 680 depicts an accuracy of any currently selected partition.

IV.B. Interacting With The Ensemble Classifier Interactive Visualization System

The real-time visual feedback ensemble classifier generator 400 and method provide two basic operations for a user to explore combinations of the component classifiers. The first operation is a partitioning operation, which divides the class space into two partitions. The second operation is arbitrary linear combinations of the component classifier for each of these partitions.

In some embodiments of the real-time visual feedback ensemble classifier generator 400, the most effective use of these two operations is in tight conjunction, iterating back and forth one with another. For example, one possible strategy is to adjust weights to find good partitions, make partitions, and then to recursively iterate to the sub-partitions. To enable these operations, the real-time visual feedback ensemble classifier generator 400 assumes that the component classifiers can produce a vector of real numbers (technically, these are unnormalized log-likelihood-like values), and have one number per possible class. The predicted class is the class with the maximum numeric value. This formulation is very natural in many multi-class classifiers including support vector machines (SVMs) and logistic regression. If a classifier can only output a single predicted class, this can be represented as a vector with a single non-zero value.

In addition, the component classifiers are previously trained. It is suggested that the component classifiers be trained in a robust manner, such as with 10-fold cross validation. Doing so increases the likelihood that partitioning or linear combination operations that improve accuracy on the training data set will generalize to the entire data set.

IV.B.1. Weighted Linear Combination Module

Figure 7:
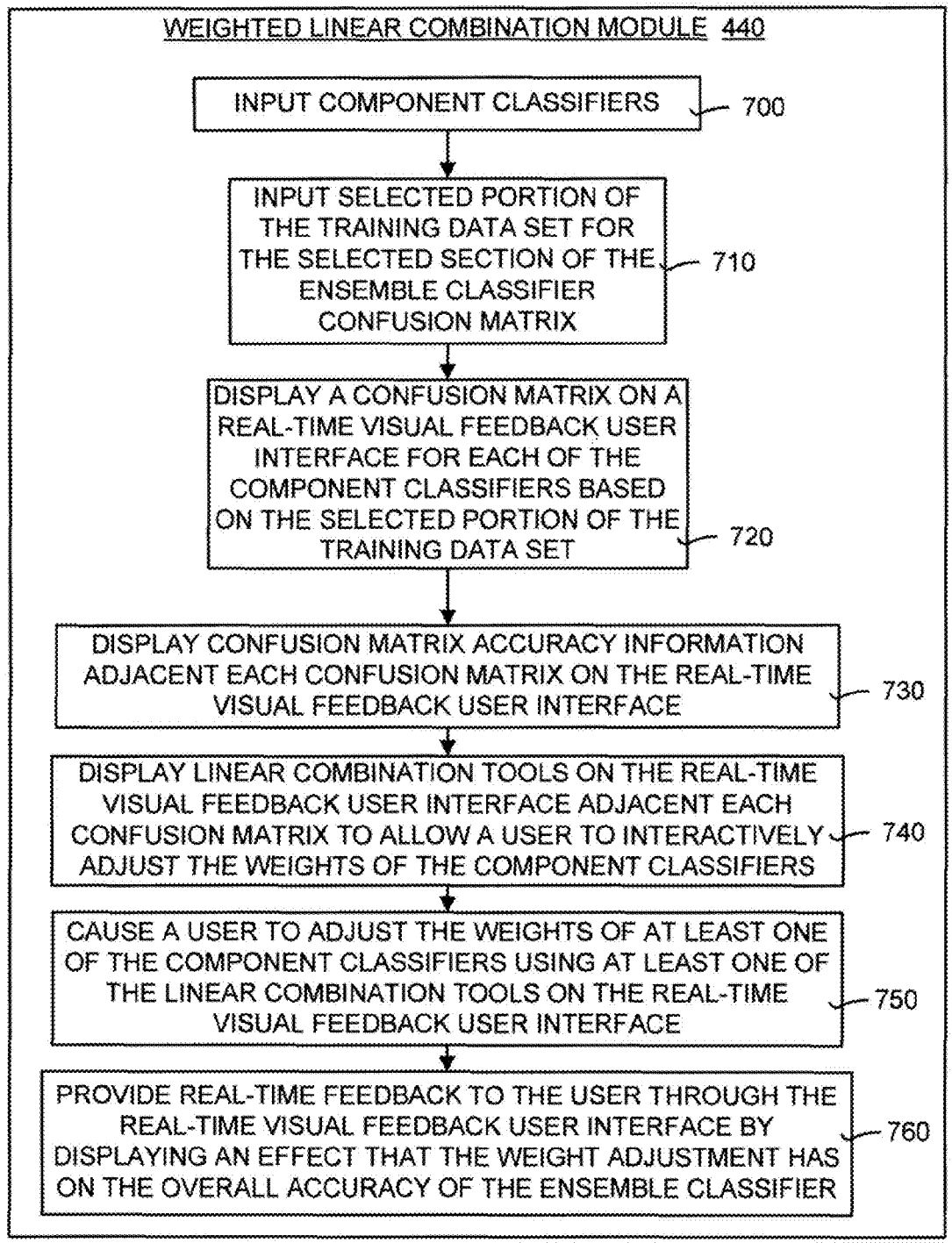
FIG. 7 is a detailed flow diagram illustrating the operation of the weighted linear combination module shown in FIG. 4.

FIG. 7 is a detailed flow diagram illustrating the operation of the weighted linear combination module 440 shown in FIG. 4. The module 440 begins by inputting component classifiers of the selected portion or section (box 700). The selected portion of the training data set then is input for the selected section of the ensemble classifier confusion matrix (box 710). In some cases the selected section may be the entire ensemble classifier confusion matrix. A confusion matrix then is displayed on a real-time visual feedback user interface for each of the component classifiers based on the selected portion of the training data set (box 720). The module 440 then displays confusion matrix accuracy information adjacent each confusion matrix on the real-time visual feedback user interface (box 730). In addition, the module 440 displays linear combination tools 620 and 640 on the real-time visual feedback user interface (box 740). The first tool 620 is displayed adjacent to the component classifier view 600 and the second tools 640 are displayed adjacent each confusion matrix in the component classifier view 600 to allow the user to interactively adjust the weights of the component classifiers.

A user then adjusts the weights of at least one of the component classifiers using at least one of the linear combination tools 620 and 640 on the real-time visual feedback user interface (box 750). Once these weights are adjusted by the user, the module 440 provides real-time visual feedback to the user through the real-time visual feedback user interface by displaying an effect that the weight adjustment has on the overall accuracy of the ensemble classifier (box 760).

IV.B.2. Partitioning Module

Figure 8:
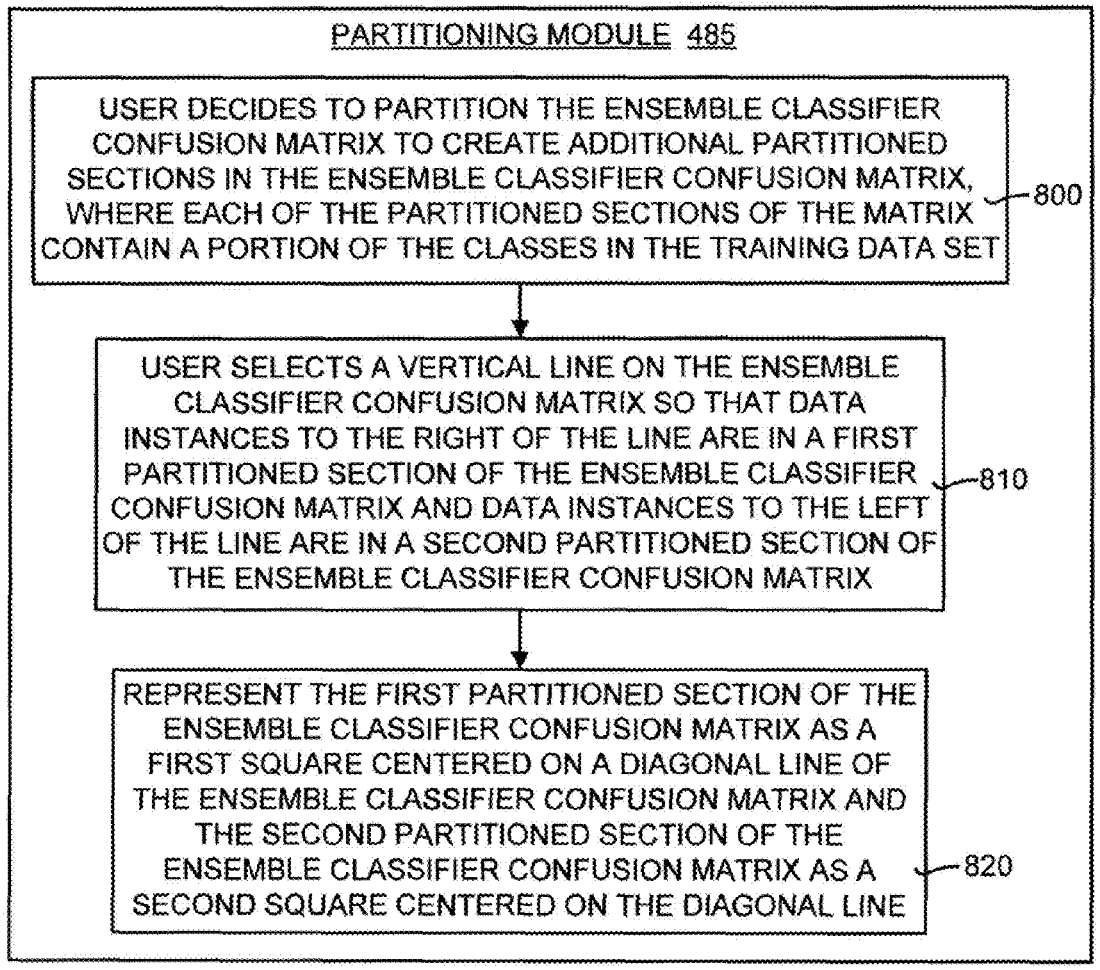
FIG. 8 is a detailed flow diagram illustrating the operation of the partitioning module shown in FIG. 4.

Partitioning the class space separates the data instances into two subsets, allowing a user to develop classifiers specialized for each subset. FIG. 8 is a detailed flow diagram illustrating the operation of the partitioning module 485 shown in FIG. 4. The user decided to partition the ensemble classifier confusion matrix to create additional partitioned sections in the ensemble classifier confusion matrix (box 800). Each of the partitioned sections of the matrix contains a portion of the classes in the training data set.

Initially, the default weight assignments for each component classifier are that each of the weights is equal. When the method first begins, the entire ensemble confusion matrix is selected and each weight of the component classifies in the entire ensemble confusion matrix are equal. In addition, whenever a partition is created by the user, each partition by default starts with an initial weight assignment where the weights are all equal. Thus, the default setting at the start of the method and for each new partition created is that the weights of the component classifiers are equal.

Next, to specify a partition, the user selects a vertical partition line on the ensemble classifier confusion matrix (box 810). Data instances that fall to the right of the vertical partition line are in a first partitioned section of the ensemble classifier confusion matrix and data instances to the left of the vertical partition line are in a second partitioned section of the ensemble classifier confusion matrix. Once partitioned, the data instances may not cross the vertical partition line despite further partitioning or refinements to the classifiers on either side. Technically, this means that the two subset classifiers are restricted to only predicting classes which fall on the appropriate side of the vertical partition line. Embodiments of the real-time visual feedback ensemble classifier generator 400 accomplish this by maximizing over an appropriate subset of the numeric vector. This constraint makes the behavior of the partition easier to interpret and to represent visually.

One impact of this partitioning constraint is that data instances that are on the wrong side of the partition will remain on the wrong side despite further refinement. To emphasize this fact, embodiments of the real-time visual feedback ensemble classifier generator 400 automatically add a horizontal split represented by a horizontal partition line at the same position as the vertical partition line, thus creating four quadrants for each partition. Data instances in the off-diagonal quadrants are those which will remain incorrectly classified.

In some embodiments, the module 485 represents the first partitioned section of the ensemble classifier confusion matrix as a first square centered on a diagonal line of the ensemble classifier confusion matrix (box 820). In addition, the module 485 represents the second partitioned section of the ensemble classifier confusion matrix as a second square centered on the diagonal line. This partitioning and re-weighting of component classifiers in the partition can be performed an arbitrary number of times and in any order, leading to a large number of possible refinement strategies.

IV.B.3. Ensemble Classifier Accuracy Module

Figure 9:
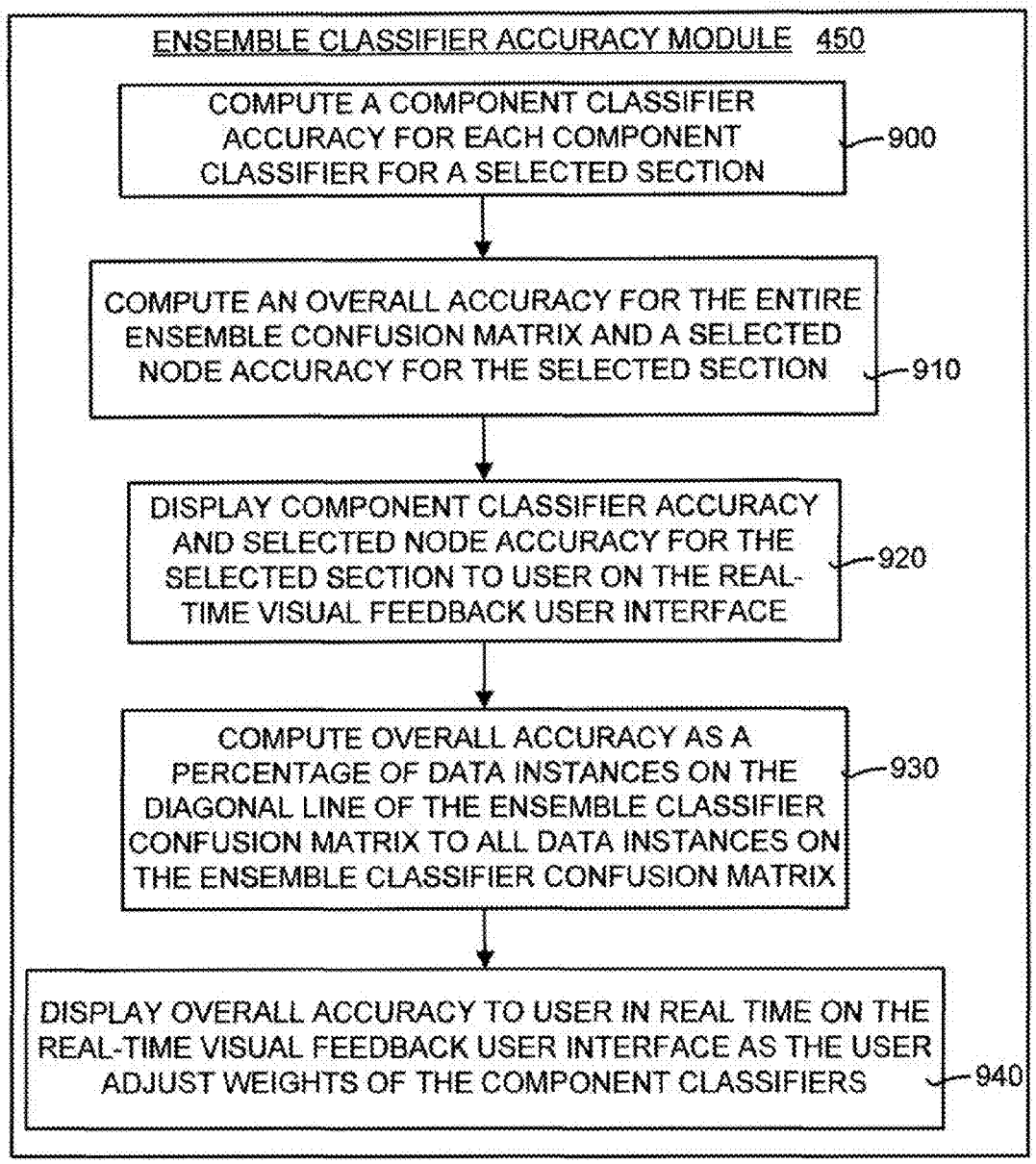
FIG. 9 is a detailed flow diagram illustrating the operation of the ensemble classifier accuracy module shown in FIG. 4.

FIG. 9 is a detailed flow diagram illustrating the operation of the ensemble classifier accuracy module 450 shown in FIG. 4. In general, the module 450 computes accuracy in real time as the user partitions the ensemble classifier confusion matrix and re-weights the component classifiers. Specifically, the module 450 computes a component classifier accuracy for each component classifier for the selected section (box 900). In addition, an overall accuracy for the entire ensemble confusion matrix and a selected node accuracy for the selected section is computed (box 910).

The module 450 displays the component classifier accuracy and the selected node accuracy for the selected section to the user on the real-time visual feedback user interface (box 920). Moreover, an overall accuracy is computed as a percentage of the data instances on the diagonal line of the ensemble classifier confusion matrix to all data instances on the matrix (box 930). The overall accuracy is displayed to the user in real time on the real-time visual feedback user interface as the user adjusts weights of the component classifiers (box 940). This real-time visual feedback is provided to the user no matter whether the user in adjusting weights of component classifiers in a partitioned section of the matrix or the entire matrix.

IV.C. Exemplary Example

For purposes of better understanding the real-time visual feedback ensemble classifier generator 400, an exemplary example is presented. It should be understood that this exemplary example is only one of many ways in which the real-time visual feedback ensemble classifier generator 400 and method can be implemented.

Figure 10:
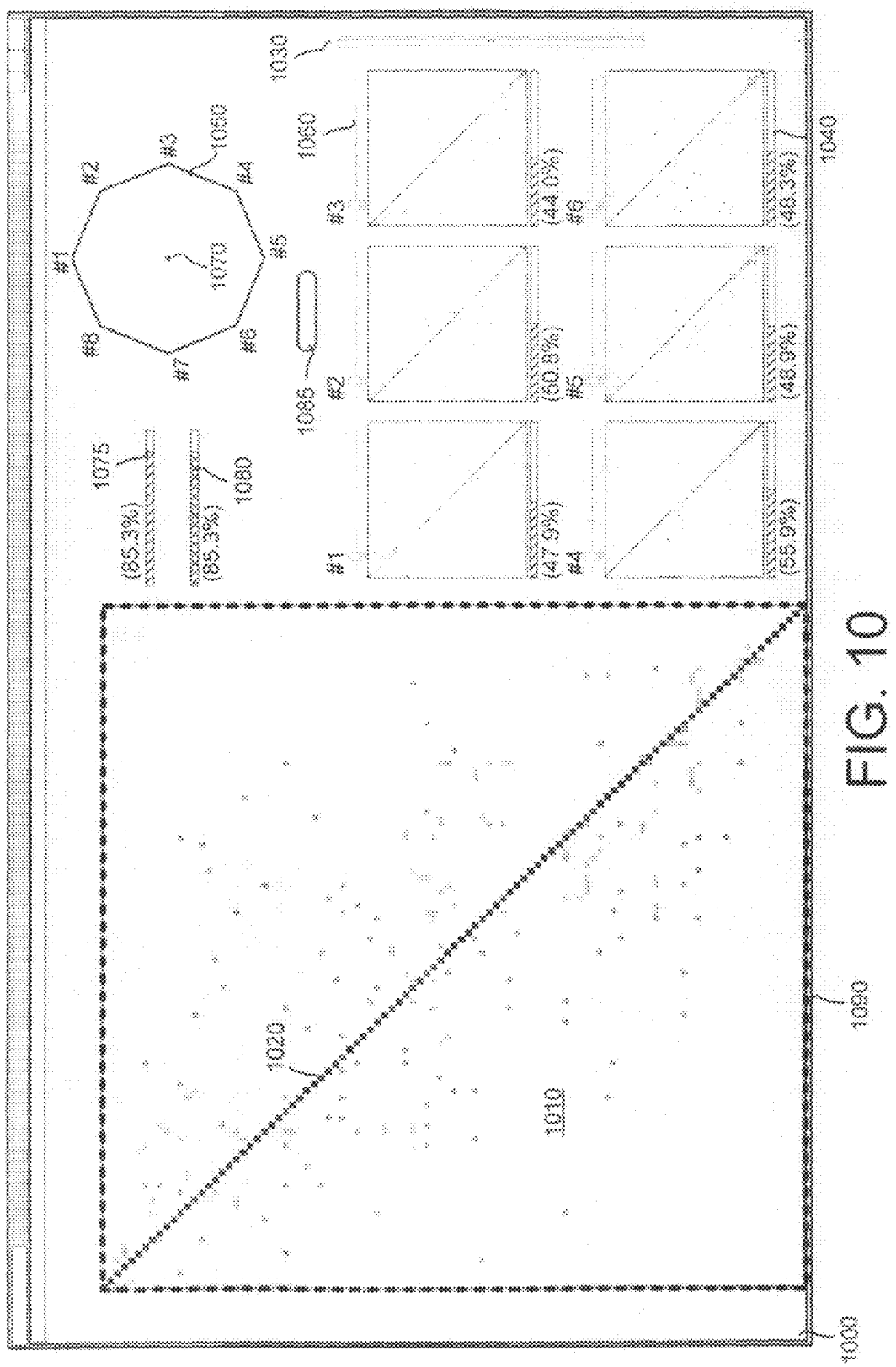
FIG. 10 is a block diagram illustrating an exemplary example of the real-time visual feedback user interface shown in FIG. 6.

FIG. 10 is a block diagram illustrating an exemplary example of the real-time visual feedback user interface 480 shown in FIG. 6. The user interface 1000 of FIG. 10 is initially displayed to a user. As can be seen in FIG. 10, the user interface 1000 includes an ensemble classifier confusion matrix 1010. The confusion matrix 1010 includes a plurality of data instances on the matrix 1010 and a diagonal line 1020. The diagonal line 1020 represents the ideal scenario, or where it is desirable for the data instances to fall. The classes of the training data set are shown along the vertical and horizontal axes of the ensemble classifier confusion matrix 1010. In this exemplary embodiment, the training data set is the CalTech 101 training data set, containing 101 classes.

The user interface 1000 also includes component classifier confusion matrices. In the example of FIG. 10, only six matrices are shown on screen or display device, even though eight matrices are being used by the generator 400. In this case, a scroll bar 1030 is used to scroll down and access the two remaining confusion matrices. The component classifier confusion matrices include an accuracy bar 1040 below the matrix. This accuracy bar reflects the accuracy of the corresponding component classifier.

As shown in FIG. 10, there are two ways in which the user can manipulate the linear combination of component classifiers. First, as shown in FIG. 6, embodiments of the generator 400 provide a linear combination tool 620. In some embodiments, and in the exemplary embodiment shown in FIG. 10, the linear combination tool is a simple two-dimensional (2D) interpolation control in the form of a polygon 1050 having a number of sides equal to the number of component classifiers. The user can interactively scrub inside this polygon to specify classifier weights. In the exemplary embodiment shown in FIG. 10, the polygon 1050 contains eight sides, corresponding to the eight component classifiers used for the ensemble classifier.

In some embodiments, to make the appropriate mapping of position to weight the polygon is parameterized using Wachspress coordinates. As is known to those having ordinary skill in the art, Wachspress coordinates have two important properties. First, at the vertices of the polygon 1050 the weight is one for the classifier at that vertex and zero for all other classifiers. Second, at the center of the polygon 1050 the classifiers all have the same weight. These points seem to be the most natural in this class space and it was desirable for the subspace represented by the polygon 1050 to include those points.

As noted above, this subspace is only two dimensional and hence much of the weight space is not included in the polygon 1050. Thus, some embodiments of the generator 400 also include a second way in which the user can manipulate the weights of the component classifiers. In particular, some embodiments include individual sliders 1060 over each component classifier confusion matrix to allow the user to specify an arbitrary normalized combination of weights should they need the extra control. These individual sliders 1060 are shown in FIG. 10.

In addition, the polygon 1050 includes an adjustment object 1070 that the user can drag around the polygon 1050. Initially, the adjustment object 1070 starts in the center of the polygon 1050 where, as mentioned above, all the weights are equalized. As the user drags the adjustment object 1070 around the polygon 1050, the slider 1060 above the corresponding component classifier confusion matrix also moves. It should be noted that for this example the polygon is a two-dimensional tool, while in reality the space for adjusting the weights is eight-dimensional space. Thus, as will be seen below, there are times when the user will move the sliders 1060 and the adjustment object 1070 will disappear from the polygon 1050 because the location of the dot cannot be represented in 2D space.

The user interface 1000 of FIG. 10 also includes an equalize weights button 1085 that will equalize the weight. When the user clicks on this equalize weights button 1085, each of the weights of the component classifiers are equalized, such that the component classifiers all have the same weight. In addition, in some embodiments the user interface 1000 shown in FIG. 10 includes a dotted line 1090 around the area of interest. This dotted line 1090 is placed around the perimeter of an area when the area is selected by the user. In this case, the area of interest is the entire ensemble classifier confusion matrix 1010. In other embodiments, the dotted line 1090 may be a colored dotted line or be a solid colored line.

The user interface 1000 also includes a selected node accuracy bar 1075 and an overall accuracy bar 1080. The selected node accuracy bar 1075 shows the accuracy for a selected node. For example, if a partitioned section of the ensemble classifier confusion matrix is selected, the selected node accuracy bar 1075 would show the accuracy for that node. The overall accuracy bar 1080 shows the overall accuracy for the ensemble classifier.

When presented with the user interface 1000 shown in FIG. 10, the user can also manipulate the weights of the eight component classifiers by using the individual sliders 1060 above the component classifier confusion matrices. As will be seen below, manipulating the weights of the component classifiers changes the overall accuracy of the ensemble matrix.

Figure 11:
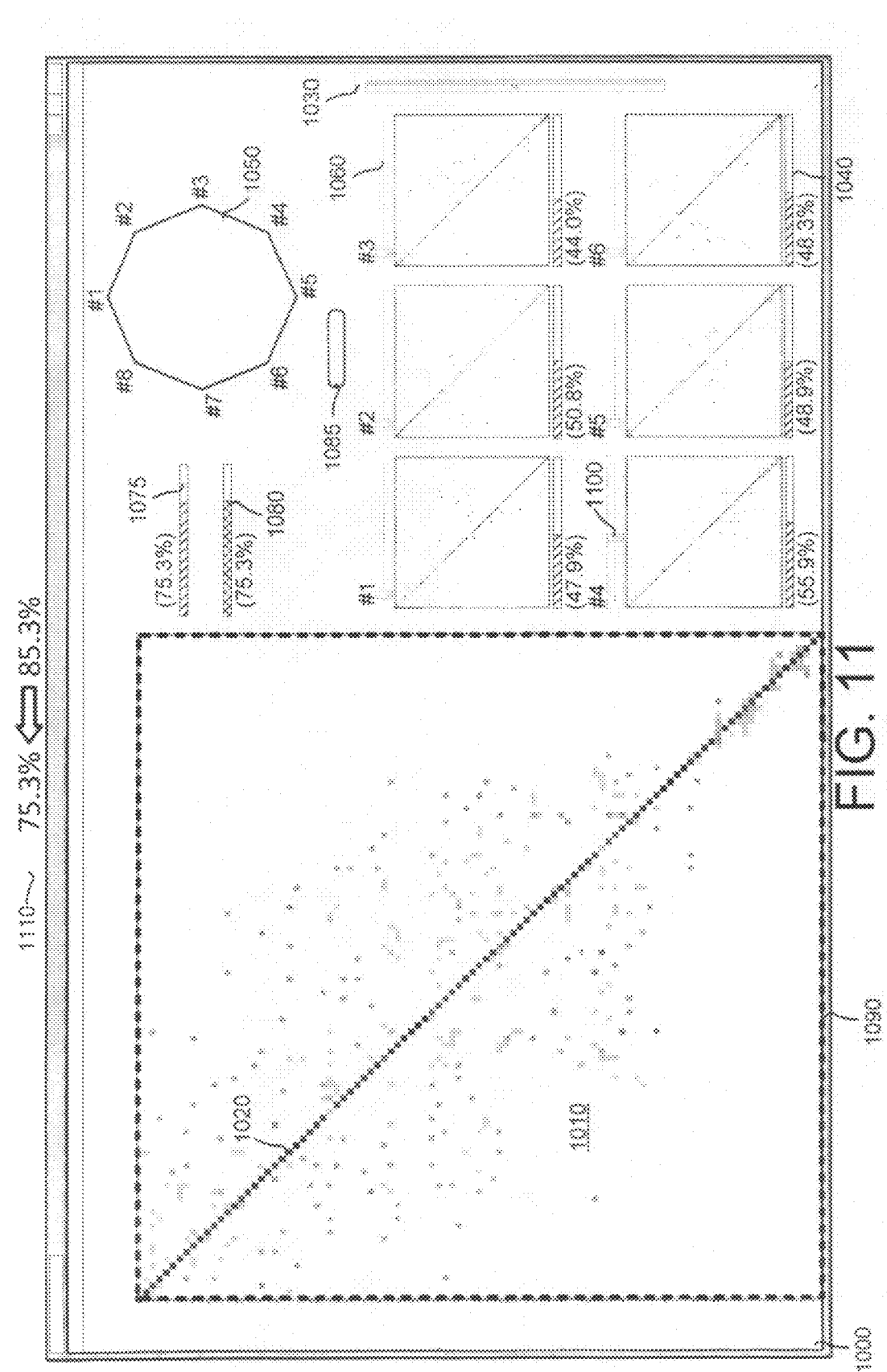
FIG. 11 is a block diagram illustrating the exemplary example of the user interface shown in FIG. 10 after manipulation by a user.

FIG. 11 is a block diagram illustrating the exemplary example of the user interface 1000 shown in FIG. 10 after manipulation by a user. In particular, it can be seen in FIG. 11 that the user has moved the slider 1100 of the fourth component classifier to the right. In this case, the weights of the other component classifiers have been automatically moved to the left, since increasing a weight for one component classifier necessarily reduces weights of the other component classifiers.

In addition, referring to FIGS. 10 and 11, it can be seen that the adjustment object 1070 in the polygon 1050 of FIG. 10 is not present in FIG. 11. As explained above, this is because the current settings of the component classifiers may not be represented in the 2D space of the polygon 1050. By simply clicking on the polygon 1050 the user is able to restore the adjustment object 1070 to the place in the polygon 1050 where the user clicked. Moreover, the slider settings and weights of the component classifiers represented by the location of the adjustment object 1070 are set appropriately. Further, even though the weights can be equalized by moving the adjustment object 1070 to the center of the polygon 1050, the user may find it easier to simply click on the equalize weights button 1085 to equalize the weights.

The overall accuracy bar 1080 in FIG. 11 indicates that this action of moving the slider 1100 has reduced the overall accuracy of the ensemble classifier from 85.3% (shown in FIG. 10) to 75.3% (shown in FIG. 11). This is depicted by the label 1110 in FIG. 11. Thus, the user manipulation has caused the overall accuracy to decrease. Even though the overall accuracy has decreased, it can be seen in FIG. 11 that the data instances in the lower right portion of the ensemble classifier confusion matrix 1010 lie more on the diagonal line 1020 that the same area in FIG. 10. In this example the user has selected this area for partitioning. Note that the system 400 resorts columns and rows in the ensemble classifier confusion matrix based on the user interactively defining different weights on the component classifiers such that any clusters of misclassifications in the ensemble classifier confusion matrix can easily be identified by the user.

Figure 12:
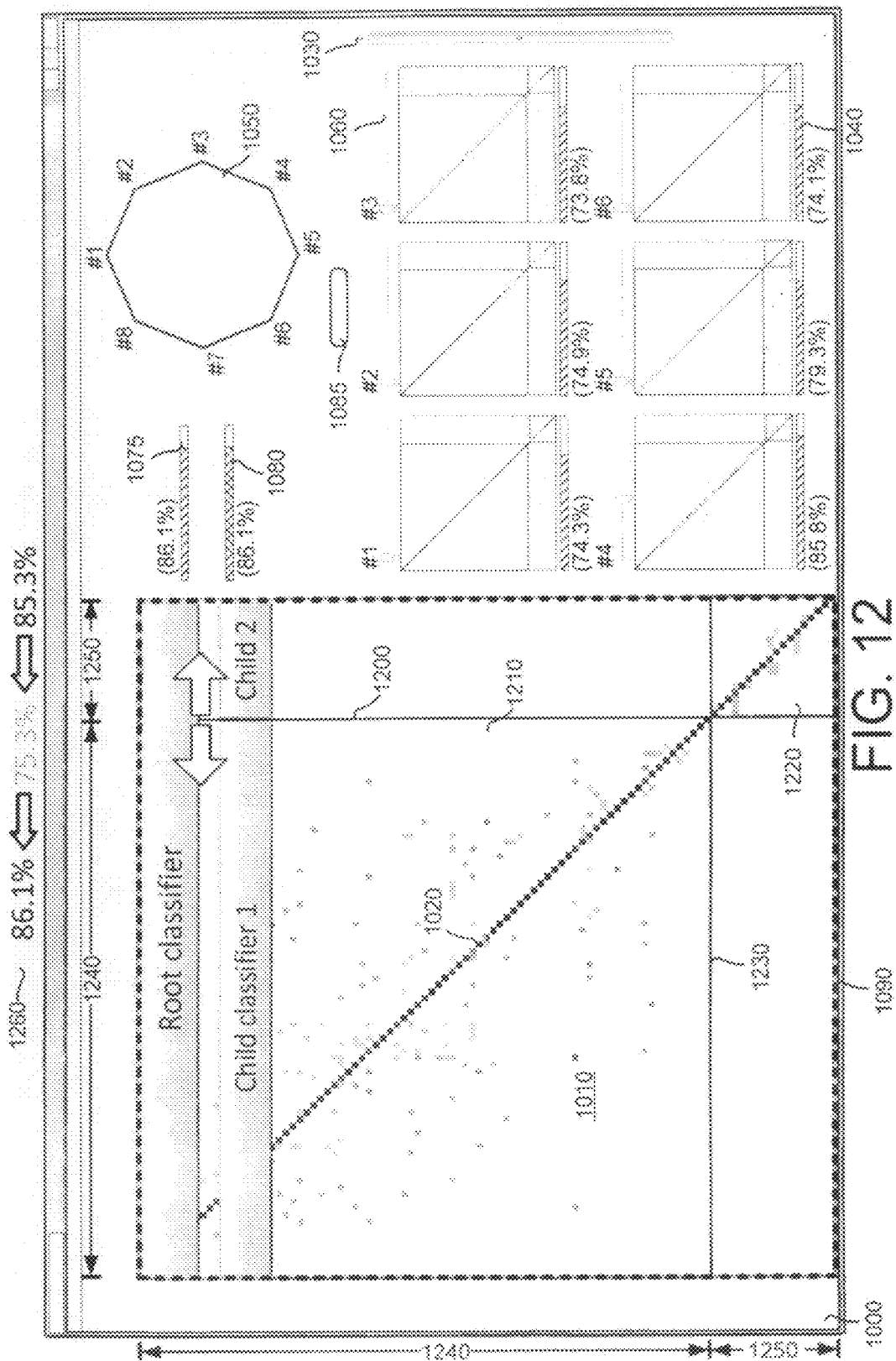
FIG. 12 is a block diagram illustrating the exemplary example of the user interface shown in FIGS. 10 and 11 after partitioning by the user.

FIG. 12 is a block diagram illustrating the exemplary example of the user interface 1000 shown in FIGS. 10 and 11 after partitioning by the user. As noted above, the initial weight assignments for each component classifier of each partition is that each of the weights is equal. As shown in FIG. 12, the user has made a vertical partition line 1200 to separate the matrix 1010 into a first partitioned section 1210 and a second partitioned section 1220. In addition, a horizontal partition line 1230 is drawn by the generator 400. The data instances in the first partitioned section 1210 are from a first portion of classes 1240 of the training data set and the data instances in the second partitioned section 1220 are from a second portion of classes 1250 of the training data set.

The user can click on the first partitioned section 1210 in order to bring that area into focus. In this case, the dotted line 1090 will be around the perimeter of the first partitioned section 1210. Similarly, if the user wants to focus on the second partitioned section 1220, the use can click anyway in the second partitioned section 1220 to bring that area into focus. This will cause the dotted line 1090 to be around the perimeter of the second partitioned section 1220. It should be noted that the user can undo the partition. By way of example, in some embodiments the user can use the keyboard sequence <control-z> or a left click of a mouse to undo the partition. Moreover, in some embodiments the real-time visual feedback ensemble classifier generator 400 keeps a history of weighting and partitioning operations performed by the user in order to generate an operations history. This operations history can be used to put the user back at some previous point in the iterative process. The real-time visual feedback ensemble classifier generator 400 permits the user to undo previous operations using the operations history. This allows the user to interactively explore as many options as possible in searching for an optimal ensemble classifier. The real-time visual feedback ensemble classifier generator 400 also permits the user to unpartition at any time. In particular, the user may realize after creating a partition that the specific partition does not work as well as desired. This unpartitioning process can be performed at any time at any section that has sub-partitions. For example, the user can press the right mouse button while the control key is pressed to unpartition. In addition, the unpartition operation is recursively applied to sub-partitions if they have further sub-partitions, such that unpartitioning a selected parent partition will also eliminate child partitions of the parent partition.

By clicking on the first partitioned section 1210 or the second partitioned section 1220 the user can select either section and continue refining just component classifiers for only that subset of the training data set. This refinement process can be further partitioning of the ensemble classifier confusion matrix, adjusting weights of the component classifiers, or both. Given the user specified weights, embodiments of the generator 400 take the vectors of numeric values output by the component classifiers and linearly combine them. This partitioning and re-weighting process can be done an arbitrary number of times and in any order, leading to a large number of possible refinement strategies.

The overall accuracy bar 1080 in FIG. 12 indicates that this partitioning action has increased the overall accuracy of the ensemble classifier from 85.3% (shown in FIG. 10) to 75.3% (shown in FIG. 11) to its current value of 86.1% (shown in FIG. 12). This is depicted by the label 1260 in FIG. 12. Thus, the user manipulation has caused the overall accuracy to decrease, but the partitioning has increased the overall accuracy of the ensemble classifier.

Figure 13:
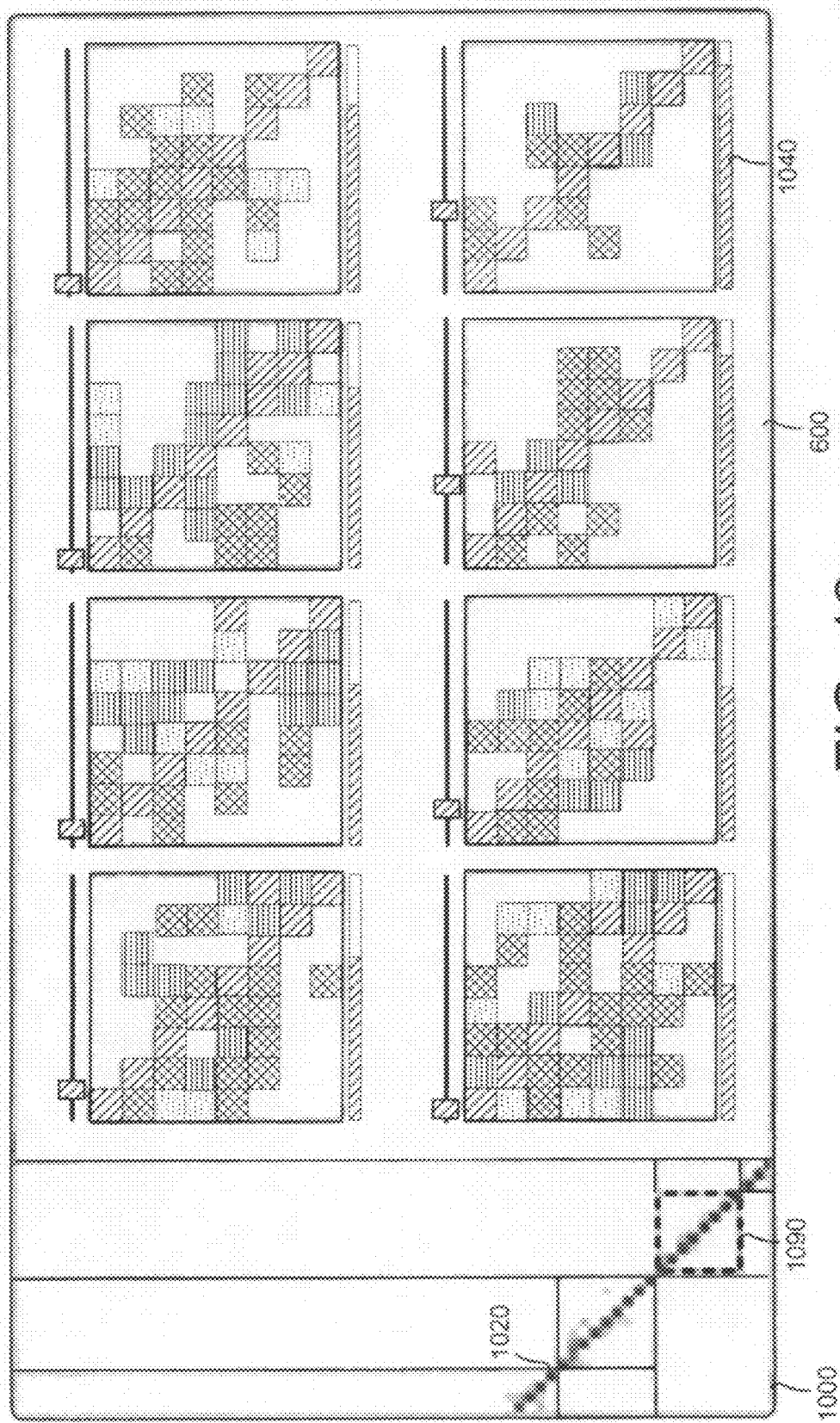
FIG. 13 illustrates the component classifier view after partitioning the ensemble classifier confusion matrix and selecting a partitioned section.

When a particular partitioned section is selected by the user, the component classifier view 600 is updated so that each confusion matrix corresponding to the component classifiers show data instances contained in that portion of the training data set. FIG. 13 illustrates the component classifier view 600 after partitioning the ensemble classifier confusion matrix and selecting a partitioned section. As shown in FIG. 13, the selected partitioned section, which is outlined in the dotted line 1090, causes the confusion matrices in the component classifier view 600 to display only the data instances in that selected partitioned section. As can be seen from FIG. 13, each of the component classifiers demonstrates very different behavior in this partition, including clustering and large differences in accuracy.

Figure 14:
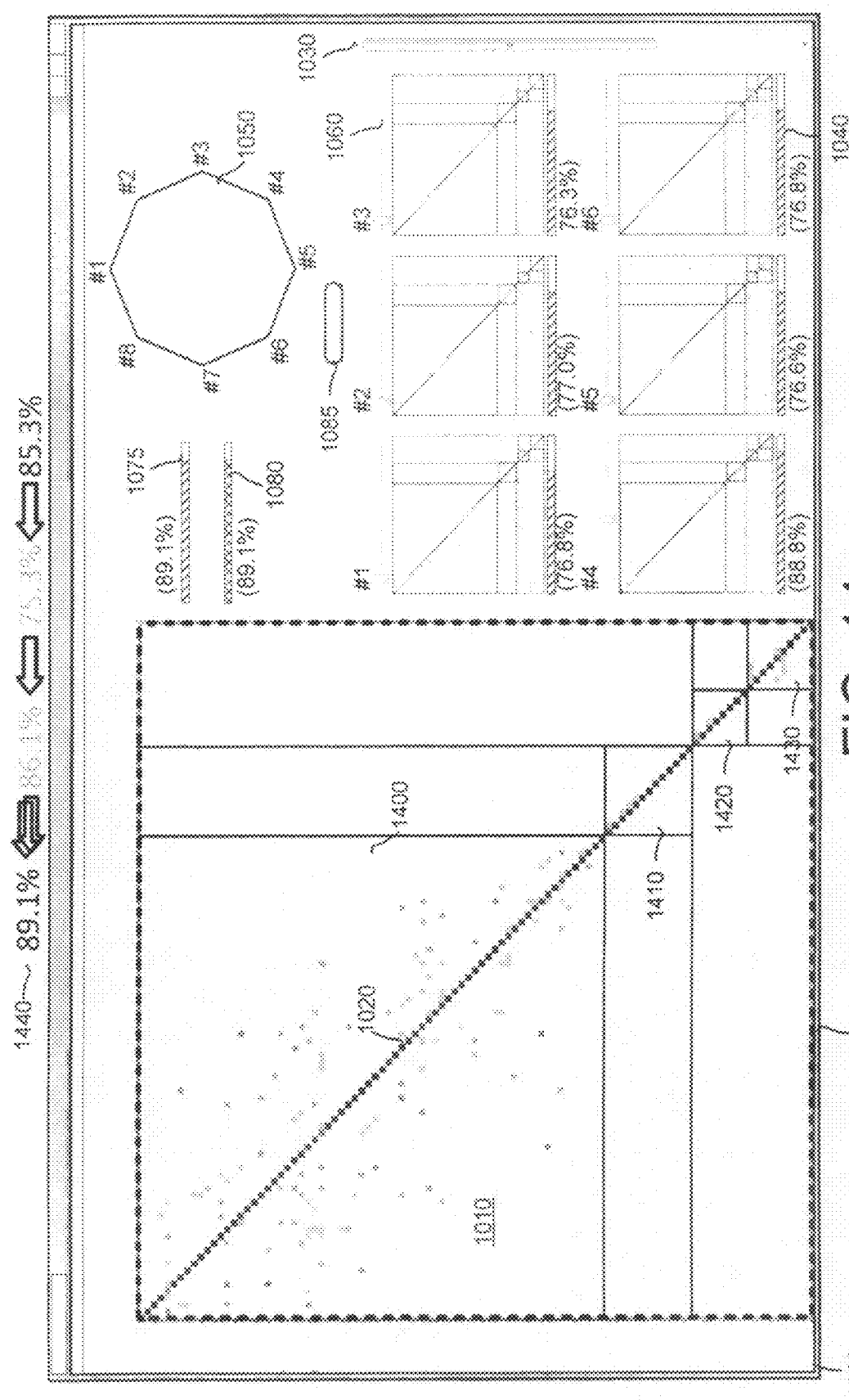
FIG. 14 is a block diagram illustrating the exemplary example of the user interface shown in FIGS. 10-13 after further partitioning by the user.

FIG. 14 is a block diagram illustrating the exemplary example of the user interface 1000 shown in FIGS. 10-13 after further linear combination and partitioning by the user. In particular, the user has further partitioned the first partitioned section 1210 into a third partitioned section 1400 and a fourth partitioned section 1410, and the second partitioned section 1220 into a fifth partitioned section 1420 and a sixth partitioned section 1430. Each partitioned section contains all of the component classifiers, but only a portion of the classes in the training data set.

The user can click the outermost square to check the accuracy of the ensemble classifier. This is indicated by the dotted line 1090, which goes around the perimeter of the entire ensemble classifier confusion matrix 1010. The overall accuracy bar 1080 in FIG. 14 indicates that this further partitioning action has increased the overall accuracy of the ensemble classifier from 85.3% (shown in FIG. 10), to 75.3% (shown in FIG. 11), to 86.1% (shown in FIG. 12), to its current value of 89.1%. This is depicted by the label 1440 in FIG. 14. The double arrows between the 89.1% and the 86.1% indicate that more than one step was necessary to arrive at that percentage. In this case, two additional partitioning operations and many linear combination operations were performed on the ensemble classifier confusion matrix 1010. These two operations are not shown.

There is a point at which the benefits of partitioning stop accruing. At this point the partitioning provides diminishing returns. The goal is to obtain the highest accuracy possible. Typically, the user will stop partitioning when the overall classification accuracy stops increasing. This is an indication that the optimal point has been reached, and that any further manipulation may over classify the ensemble classifier. In some embodiments, metrics such as mathematical quantities are used as a threshold accuracy. In other embodiments the user makes the determination when to end the iteration.

V. Exemplary Operating Environment

Embodiments of the real-time visual feedback ensemble classifier generator 400 and method are designed to operate in a computing environment. The following discussion is intended to provide a brief, general description of a suitable computing environment in which embodiments of the real-time visual feedback ensemble classifier generator 400 and method may be implemented.

Figure 15:
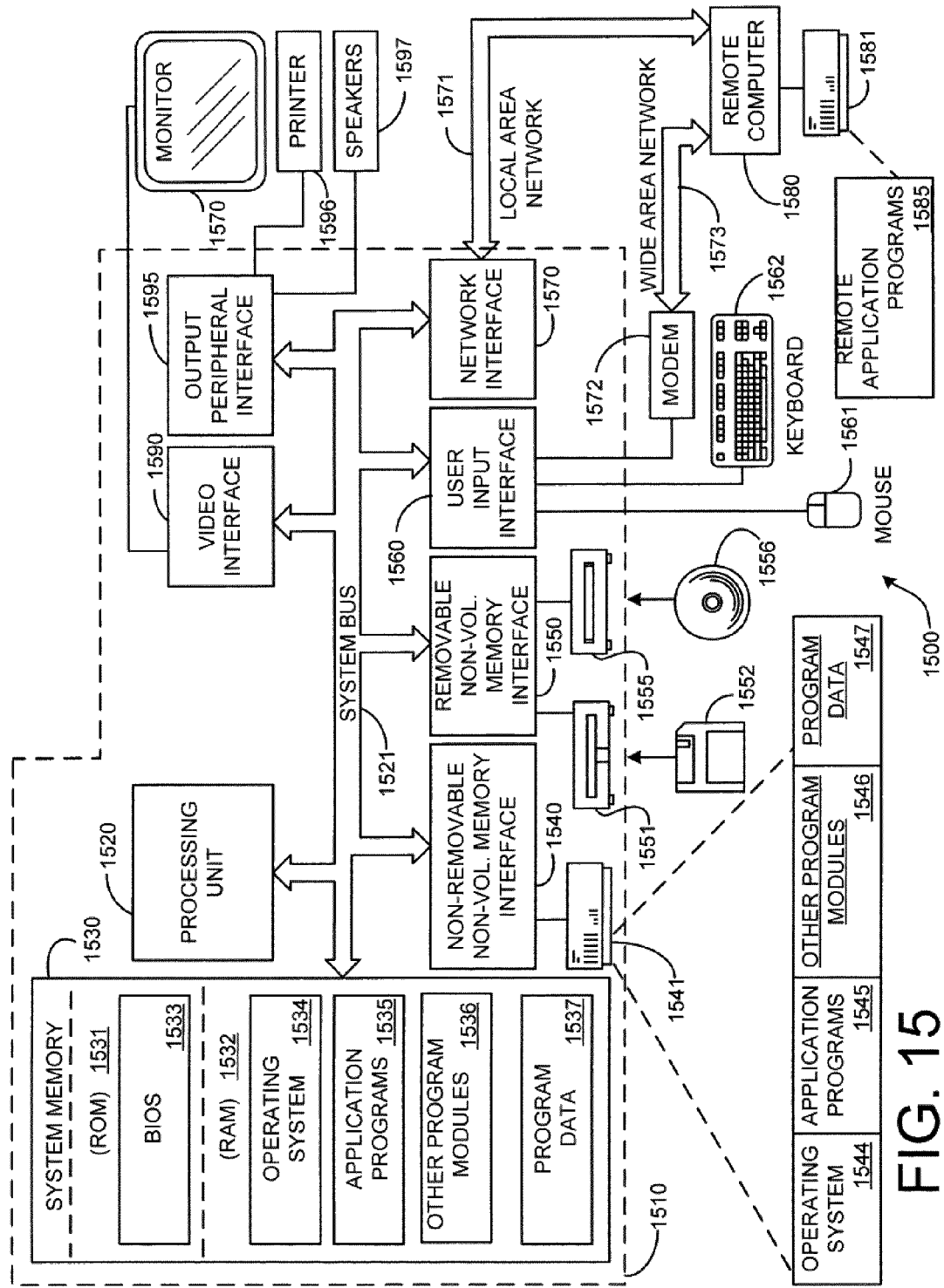
FIG. 15 illustrates an example of a suitable computing system environment in which embodiments of the real-time visual feedback ensemble classifier generator and method shown in FIGS. 4-14 may be implemented.

FIG. 15 illustrates an example of a suitable computing system environment in which embodiments of the real-time visual feedback ensemble classifier generator 400 and method shown in FIGS. 4-14 may be implemented. The computing system environment 1500 is only one example of a suitable computing environment and is not intended to suggest any limitation as to the scope of use or functionality of the invention. Neither should the computing environment 1500 be interpreted as having any dependency or requirement relating to any one or combination of components illustrated in the exemplary operating environment.

Embodiments of the real-time visual feedback ensemble classifier generator 400 and method are operational with numerous other general purpose or special purpose computing system environments or configurations. Examples of well known computing systems, environments, and/or configurations that may be suitable for use with embodiments of the real-time visual feedback ensemble classifier generator 400 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the real-time visual feedback ensemble classifier generator 400 and method may be described in the general context of computer-executable instructions, such as program modules, being executed by a computer. Generally, program modules include routines, programs, objects, components, data structures, etc., that perform particular tasks or implement particular abstract data types. Embodiments of the real-time visual feedback ensemble classifier generator 400 and method may also be practiced in distributed computing environments where tasks are performed by remote processing devices that are linked through a communications network. In a distributed computing environment, program modules may be located in both local and remote computer storage media including memory storage devices. With reference to FIG. 15, an exemplary system for the real-time visual feedback ensemble classifier generator 400 and method includes a general-purpose computing device in the form of a computer 1510.

Components of the computer 1510 may include, but are not limited to, a processing unit 1520 (such as a central processing unit, CPU), a system memory 1530, and a system bus 1521 that couples various system components including the system memory to the processing unit 1520. The system bus 1521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1510 typically includes a variety of computer readable media. Computer readable media can be any available media that can be accessed by the computer 1510 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1510. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1540 includes computer storage media in the form of volatile and/or nonvolatile memory such as read only memory (ROM) 1531 and random access memory (RAM) 1532. A basic input/output system 1533 (BIOS), containing the basic routines that help to transfer information between elements within the computer 1510, such as during start-up, is typically stored in ROM 1531. RAM 1532 typically contains data and/or program modules that are immediately accessible to and/or presently being operated on by processing unit 1520. By way of example, and not limitation, FIG. 15 illustrates operating system 1534, application programs 1535, other program modules 1536, and program data 1537.

The computer 1510 may also include other removable/non-removable, volatile/nonvolatile computer storage media. By way of example only, FIG. 15 illustrates a hard disk drive 1541 that reads from or writes to non-removable, nonvolatile magnetic media, a magnetic disk drive 1551 that reads from or writes to a removable, nonvolatile magnetic disk 1552, and an optical disk drive 1555 that reads from or writes to a removable, nonvolatile optical disk 1556 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540, and magnetic disk drive 1551 and optical disk drive 1555 are typically connected to the system bus 1521 by a removable memory interface, such as interface 1550.

The drives and their associated computer storage media discussed above and illustrated in FIG. 15, provide storage of computer readable instructions, data structures, program modules and other data for the computer 1510. In FIG. 15, for example, hard disk drive 1571 is illustrated as storing operating system 1544, application programs 1545, other program modules 1546, and program data 1547. Note that these components can either be the same as or different from operating system 1534, application programs 1535, other program modules 1536, and program data 1537. Operating system 1544, application programs 1545, other program modules 1546, and program data 1547 are given different numbers here to illustrate that, at a minimum, they are different copies. A user may enter commands and information (or data) into the computer 1510 through input devices such as a keyboard 1562, pointing device 1561, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1520 through a user input interface 1560 that is coupled to the system bus 1521, but may be connected by other interface and bus structures, such as, for example, a parallel port, game port or a universal serial bus (USB). A monitor 1591 or other type of display device is also connected to the system bus 1521 via an interface, such as a video interface 1590. In addition to the monitor, computers may also include other peripheral output devices such as speakers 1597 and printer 1596, which may be connected through an output peripheral interface 1595.

The computer 1510 may operate in a networked environment using logical connections to one or more remote computers, such as a remote computer 1580. The remote computer 1580 may be a personal computer, a server, a router, a network PC, a peer device or other common network node, and typically includes many or all of the elements described above relative to the computer 1510, although only a memory storage device 1581 has been illustrated in FIG. 15. The logical connections depicted in FIG. 15 include a local area network (LAN) 1571 and a wide area network (WAN) 1573, but may also include other networks. Such networking environments are commonplace in offices, enterprise-wide computer networks, intranets and the Internet.

When used in a LAN networking environment, the computer 1510 is connected to the LAN 1571 through a network interface or adapter 1570. When used in a WAN networking environment, the computer 1510 typically includes a modem 1572 or other means for establishing communications over the WAN 1573, such as the Internet. The modem 1572, which may be internal or external, may be connected to the system bus 1521 via the user input interface 1560, or other appropriate mechanism. In a networked environment, program modules depicted relative to the computer 1510, or portions thereof, may be stored in the remote memory storage device. By way of example, and not limitation, FIG. 15 illustrates remote application programs 1585 as residing on memory device 1581. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a computing device for generating an ensemble classifier, comprising:
using the computing device to perform the following:
input a plurality of previously-trained component classifiers;
defining a weight for each of the component classifiers, where the weight determines an amount of influence a component classifier associated with the weight has on a linear combination of the multiple component classifiers;
defining the ensemble classifier as a weighted combination of the component classifiers;
displaying to a user a real-time visual feedback user interface containing visual information that represents properties of the component classifiers and the ensemble classifier;
displaying on the real-time visual feedback user interface an ensemble classifier view that depicts an ensemble classifier confusion matrix for the ensemble classifier, the ensemble classifier confusion matrix representing a class space of the ensemble classifier;
allowing the user to divide the ensemble classifier confusion matrix into a plurality of sub-partitions;
allowing the user to interactively adjust weights of component classifiers for each of the sub-partitions independent of other sub-partitions; and
displaying an effect that defining different weights has on an overall accuracy of the ensemble classifier in real time on the real-time visual feedback user interface.

2. The method of claim 1, further comprising representing classification results in the ensemble classifier confusion matrix by plotting data instances in a grid where a column is an predicted class of a data instance and a row is a true class of the data instance.

3. The method of claim 2, further comprising resorting columns and rows in the ensemble classifier confusion matrix based on the user interactively defining different weights on the component classifiers such that any clusters of misclassifications in the ensemble classifier confusion matrix can be identified by the user.

4. The method of claim 2, further comprising partitioning the ensemble classifier confusion matrix into a first partitioned section of the matrix and a second partitioned section of the confusion matrix, where the first partitioned section contains all the component classifiers and a first portion of a training data set and the second partitioned portion contains all the component classifiers and a second portion of the training data set.

5. The method of claim 4, further comprising specifying a partition of the ensemble classifier confusion matrix by selecting a vertical partition line on the ensemble classifier confusion matrix so that data instances that fall left of the vertical partition line are placed in the first partitioned section and data instances that fall right of the vertical partition line are placed in the second partitioned section.

6. The method of claim 4, further comprising adjusting weights of component classifiers in the first partitioned section independently of weights of classifiers in the second partitioned section.

7. The method of claim 4, further comprising partitioning the class space of the ensemble classifier confusion matrix to separate the data instances into the first partitioned section and the second partitioned section.

8. The method of claim 1, further comprising displaying to the user on the real-time visual feedback user interface a component classifier view that includes a component classifier confusion matrix for each of the plurality of component classifiers.

9. The method of claim 8, further comprising:
  displaying to a user in the component classifier view and adjacent a respective component classifier confusion matrix accuracy information for each of the plurality of component classifiers; and
  displaying to a user in the component classifier view and adjacent the respective component classifier confusion matrix a linear combination tool for interactively adjusting a weight for the component classifier associated with the respective component classifier confusion matrix.

10. The method of claim 9, further comprising using as the linear combination tool both of (a) a single polygon having a number of sides equal to a number of the multiple classifiers and having an adjustment object in the polygon that can be dragged around the polygon by a user to change the weight of a component classifier; and (b) a linear slider for each of the plurality of component classifiers.

11. The method of claim 1, further comprising defining the ensemble classifier as a weighted linear combination of the component classifiers using weights specified by the user.

12. The method of claim 1, further comprising:
  keeping a history of weighting and partitioning operations performed by the user to generate an operations history; and
  permitting the user to undo previous operations using the operations history to allow the user to interactively explore as many options as possible in searching for an optimal ensemble classifier.

13. A method implemented on a general-purpose computing device for linearly combining previously-trained component classifiers to form an ensemble classifier that is used to categorize objects, comprising:
  using the general-purpose computing device to perform the following process actions:
    input a training data set containing a plurality of classes and used to train the ensemble classifiers;
    defining a weight for each component classifier, where the weight indicates an amount of influence a corresponding component classifier has on a linear combination of the component classifiers;
    linearly combining the weighted component classifiers to form the ensemble classifier;
    determining an overall accuracy of the ensemble classifier and comparing the overall accuracy to a threshold accuracy;
    displaying on a real-time visual feedback user interface a component classifier confusion matrix for each of the component classifiers, the component classifier confusion matrix representing classification results of the training data set;
    adjusting the weights of the component classifiers using a linear combination tool on the real-time visual feedback user interface and providing real-time feedback to a user through the real-time visual feedback user interface to display an effect that adjusting the weights has on the overall accuracy;
    repeating the adjustment of the weights of the component classifiers until the user is satisfied with the overall accuracy to generate an optimized ensemble classifier; and
    using the optimized ensemble classifier in a machine-learning algorithm to categorize the objects into the plurality of classes.

14. The method of claim 13, further comprising:
  representing a class space of each component classifier by the component classifier confusion matrix; and
  plotting data instances in a grid where a column of the matrix is a predicted class of a data instance and a row of the matrix is a true class of the data instance.

15. The method of claim 14, further comprising displaying in the real-time visual feedback user interface an ensemble classifier confusion matrix for the ensemble classifier that displays changes in real-time as the weights of the component classifiers are adjusted.

16. The method of claim 15, further comprising:
  partitioning the ensemble classifier confusion matrix to separate data instances in the ensemble classifier confusion matrix into a plurality of partitioned sections, where each partitioned section contains all the component classifiers and associated weights, and where each partitioned section is represented by a square on a diagonal line of the ensemble classifier confusion matrix; and
  allowing a user to unpartition any partitioned section whenever the user is dissatisfied with the results of partitioning.

17. The method of claim 16, further comprising:
  selecting a partitioned section to process;
  adjusting weights of at least one of the component classifiers in the selected partitioned section to form a weighted linear combination of component classifiers for the selected partitioned section;
  displaying to the user an effect of the weight adjustment in the selected partitioned section on the overall accuracy of the ensemble classifier; and
  repeating the partitioning of the ensemble classifier confusion matrix, the weight adjustment of selected partitioned sections, and displaying the effect of the weight adjustment on the overall accuracy of the ensemble classifier until the user is satisfied with the overall accuracy to obtain the optimized ensemble classifier.

18. A real-time visual feedback user interface for display on a display device of a general-purpose computing device, comprising:
  a component classifier view that displays a confusion matrix for each of a plurality of component classifiers, where the confusion matrix represents classification results based on a training data set by plotting data instances in a grid where a column is an predicted class of a data instance and a row is a true class of the data instance;
  an ensemble classifier view that displays an ensemble classifier confusion matrix for an ensemble classifier, where the ensemble classifier is a weighted linear combination of the plurality of component classifiers, and where a weight of each component classifier determines an amount of influence that the component classifier has on the weighted linear combination of the multiple component classifiers;

a linear combination tool that provides interactive control of the weighted linear combination such that interacting with the linear combination tool changes the weights of the component classifiers;

a main accuracy area that displays an overall accuracy of the ensemble classifier and changes in real time as a user interacts with the linear combination tool to change the weights of the component classifiers;

a diagonal line on the ensemble classifier confusion matrix that represents a plot of ideal classification results;

squares of various sizes along the diagonal line that represent partitioned sections of the ensemble classifier confusion matrix, where each of the partitioned sections contains all of the component classifiers and a portion of classes in the training data set; and a distinguishing border that encompasses a perimeter of one of the squares at a time to indicate that a particular selected partitioned section of the ensemble classifier confusion matrix is in focus, meaning that the user is able to use the linear combination tool to interactively adjust weights of the component classifiers contained in the selected partitioned section and to see in real-time changes to the overall accuracy in the main accuracy area.

19. The real-time visual feedback user interface of claim 18, wherein the linear combination tool further comprises:
a polygon having a number of sides that is equal to a number of the plurality of component classifiers; and
an adjustment object inside the polygon that the user can interactively move within the polygon to change the weights of the plurality of component classifiers and a consequently the overall accuracy of the ensemble classifier.

20. The real-time visual feedback user interface of claim 19, further comprising defining the overall accuracy as a percentage of data instances on the diagonal line to all data instances on the ensemble classifier confusion matrix.

* * * * *